United States Patent
Shimizu

(10) Patent No.: US 10,434,746 B2
(45) Date of Patent: Oct. 8, 2019

(54) LAMINATED OPTICAL MEMBER, LIGHTING DEVICE, DISPLAY DEVICE, AND TELEVISION DEVICE WITH SPACERS DEFINED IN LINEAR SHAPES ALONG A PLATE SURFACE WITH AXES TILTED RELATIVE TO AN ARRANGEMENT DIRECTION OF PIXELS

(71) Applicant: Sharp Kabushiki Kaisha, Sakai, Osaka (JP)

(72) Inventor: Takaharu Shimizu, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 81 days.

(21) Appl. No.: 15/553,646

(22) PCT Filed: Feb. 24, 2016

(86) PCT No.: PCT/JP2016/055370
§ 371 (c)(1),
(2) Date: Aug. 25, 2017

(87) PCT Pub. No.: WO2016/136786
PCT Pub. Date: Sep. 1, 2016

(65) Prior Publication Data
US 2018/0036997 A1     Feb. 8, 2018

(30) Foreign Application Priority Data

Feb. 27, 2015   (JP) ................... 2015-038198

(51) Int. Cl.
*B32B 7/02*        (2019.01)
*F21S 2/00*        (2016.01)
(Continued)

(52) U.S. Cl.
CPC ............... *B32B 7/02* (2013.01); *F21S 2/00* (2013.01); *G02B 3/00* (2013.01); *G02B 3/04* (2013.01);
(Continued)

(58) Field of Classification Search
CPC .......... B32B 7/00; B32B 7/02; G02B 6/0088; G02F 1/133504; G02F 1/133606;
(Continued)

(56) References Cited

U.S. PATENT DOCUMENTS

2005/0069678 A1   3/2005  Olczak et al.
2006/0139759 A1*  6/2006  Hashimoto .......... H04N 13/307
                                                    359/619
(Continued)

FOREIGN PATENT DOCUMENTS

CN       101526682 A    9/2009
JP       2009-075366 A  4/2009
(Continued)

OTHER PUBLICATIONS

Nakagome et al., "Optical Sheet Backlight Unit and Display", Apr. 9, 2009, Espacenet—Bibliographic Data JP2009075366(A), English translation, pp. 1 of 1, 1-11, 1-23.*

(Continued)

*Primary Examiner* — Alan B Cariaso
(74) *Attorney, Agent, or Firm* — Keating & Bennett, LLP

(57) ABSTRACT

A laminated type optical member used in a display device for displaying an image based on pixels arrange in a matrix includes a first optical member, a second optical member, and spacers. The second optical member is disposed on a light entering side relative to the first optical member with a gap between the first optical member and the second optical member to overlap the first optical member. The spacers are disposed between the first optical member and the second optical member to hold the gap between the first optical member and the second optical member to form an air layer. The spacers are formed in linear shapes along a plate surface of the second optical member with axes tilted relative to an arrangement direction of the pixels.

15 Claims, 24 Drawing Sheets

(51) Int. Cl.
G02F 1/1335 (2006.01)
G02B 3/00 (2006.01)
G02B 3/04 (2006.01)
G02B 5/00 (2006.01)
G02B 5/02 (2006.01)
G09F 9/00 (2006.01)
F21V 8/00 (2006.01)
G02F 1/1333 (2006.01)

(52) U.S. Cl.
CPC ............... *G02B 5/00* (2013.01); *G02B 5/02* (2013.01); *G02B 6/0088* (2013.01); *G02B 6/0091* (2013.01); *G02F 1/1335* (2013.01); *G02F 1/133504* (2013.01); *G02F 1/133605* (2013.01); *G02F 1/133606* (2013.01); *G02F 1/133615* (2013.01); *G09F 9/00* (2013.01); *G02F 1/133603* (2013.01); *G02F 1/133611* (2013.01); *G02F 2001/133322* (2013.01); *G02F 2001/133507* (2013.01); *G02F 2001/133607* (2013.01); *G02F 2001/133613* (2013.01)

(58) Field of Classification Search
CPC ........ G02F 2001/133507; G02F 2001/133607; F21S 2/00
See application file for complete search history.

(56) References Cited

U.S. PATENT DOCUMENTS

| 2009/0213464 A1 | 8/2009 | Kurachi et al. |
| 2009/0225050 A1 | 9/2009 | Toyomaki |
| 2009/0256933 A1 | 10/2009 | Mizukami |
| 2013/0095297 A1 | 4/2013 | Sung et al. |
| 2015/0085520 A1* | 3/2015 | Liu ...................... G02B 6/0033 362/606 |
| 2015/0138781 A1* | 5/2015 | Cho ..................... G02B 5/0226 362/339 |
| 2015/0211711 A1 | 7/2015 | Sung et al. |
| 2015/0219964 A1* | 8/2015 | Park .................. G02F 1/133605 349/64 |
| 2015/0293405 A1* | 10/2015 | Park .................. G02F 1/133608 349/69 |
| 2015/0300576 A1* | 10/2015 | Matsuura .......... G02F 1/133603 362/97.1 |
| 2016/0091654 A1* | 3/2016 | Kim .................... G02B 6/0053 349/65 |

FOREIGN PATENT DOCUMENTS

| JP | 2009-150981 A | 7/2009 |
| JP | 2010-122707 A | 6/2010 |
| JP | 2013-011667 A | 1/2013 |
| JP | 2013-083950 A | 5/2013 |

OTHER PUBLICATIONS

Horie et al., "Optical Sheet Backlight Unit and Display Device", Jul. 9, 2009, Espacenet—Bibliographic Data JP2009150981(A), English translation, pp. 1 of 1, 1-20.*

Official Communication issued in International Patent Application No. PCT/JP2016/055370, dated May 31, 2016.

* cited by examiner

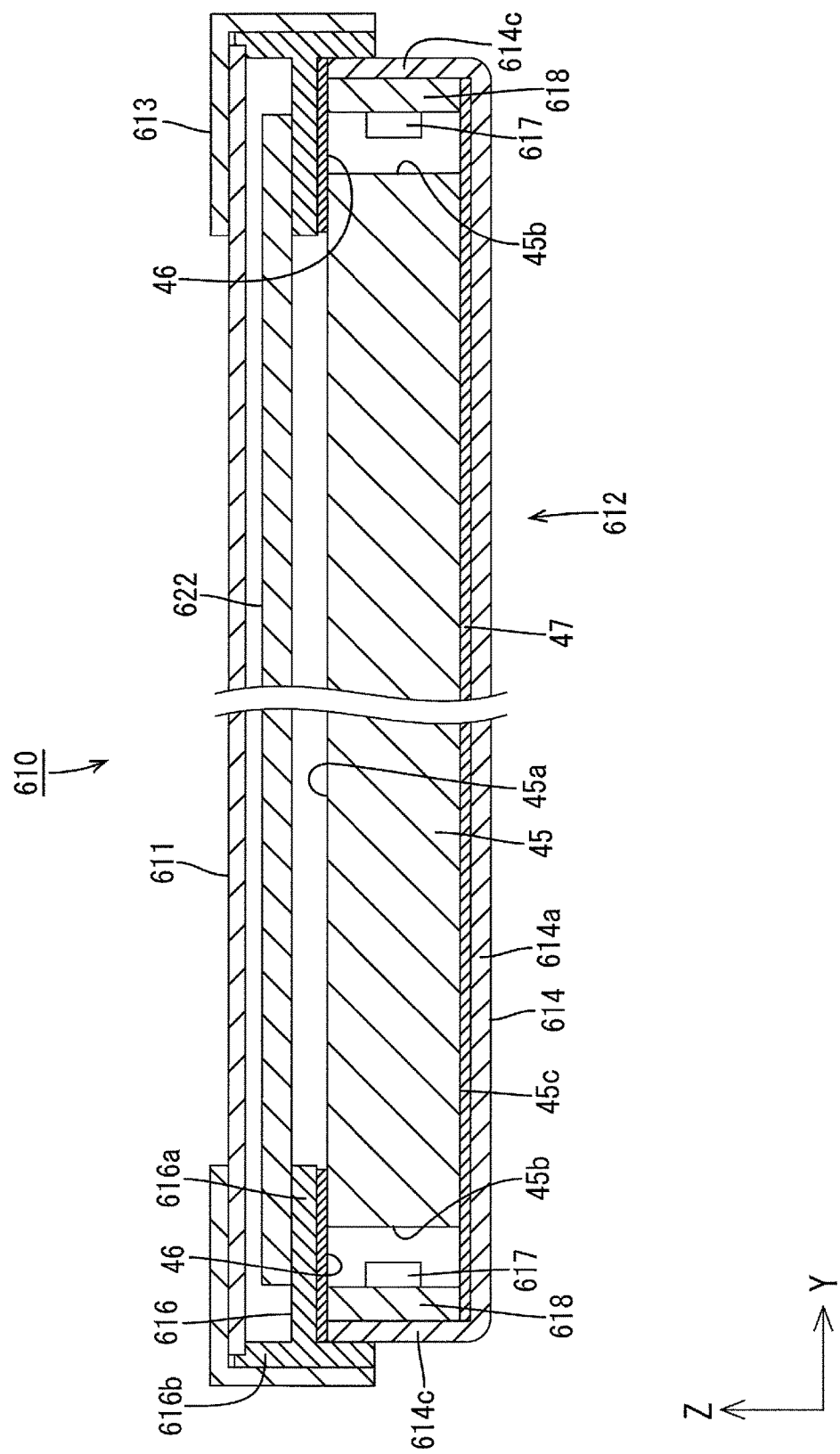

LAMINATED OPTICAL MEMBER, LIGHTING DEVICE, DISPLAY DEVICE, AND TELEVISION DEVICE WITH SPACERS DEFINED IN LINEAR SHAPES ALONG A PLATE SURFACE WITH AXES TILTED RELATIVE TO AN ARRANGEMENT DIRECTION OF PIXELS

TECHNICAL FIELD

The present invention relates to a laminated type optical member, a lighting device, a display device, and a television device.

BACKGROUND ART

In recent years, a display component in an image display device such as a television device is shifting from a conventional cathode ray tube to a thin display panel such as a liquid crystal panel and a plasma display panel. With the thin display panel, a thickness of the image display device can be reduced. Because the liquid crystal panel used in the liquid crystal display device does not produce light by itself, it requires a backlight unit as a separate lighting unit. The backlight unit includes at least a light source and an optical member that is configured to exert optical effects on light rays emitted by the light source and direct the light rays to the liquid crystal panel. An example of such an optical member is disclosed in Patent Document 1. The optical member disclosed in Patent Document 1 is a composite sheet for a backlight unit including a first prism sheet, a second prism sheet, and a protective sheet. Prism ribs of the first prism sheet are bonded to a lower surface of the second prism sheet. Prism ribs of the second prism sheet are bonded to a lower surface of the protective sheet.

RELATED ART DOCUMENT

Patent Document

Patent Document 1: Unexamined Japanese Patent Application Publication No. 2013-83950

Problem to be Solved by the Invention

In the composite sheet for a backlight unit disclosed in Patent Document 1, the sheets are bonded to one another with adhesive layers made of an ultraviolet curable resin material in solid patterns. Therefore, the prism ribs facing the corresponding adhesive layers may not be able to exert a sufficiently level of optical performance.

DISCLOSURE OF THE PRESENT INVENTION

The present invention was made in view of the above circumstances. An object is to properly exert optical performance.

Means for Solving the Problem

A laminated type optical member according to the present invention is used in a display device for displaying an image based on pixels arranged in a matrix. The laminated type optical member includes a first optical member, a second optical member, and spacers. The second optical member is disposed on a light entering side relative to the first optical member with a gap between the first optical member and the second optical member to overlap the first optical member. The spacer is disposed between the first optical member and the second optical member to hold the gap between the first optical member and the second optical member to form an air layer. The spacer is formed in a linear shape along a plate surface of the second optical member with an axis tilted relative to an arrangement direction of the pixels.

With the air layer formed between the first optical member and the second optical member with the spacer, a difference in refractive index is created between the second optical member and the air layer. Therefore, the second optical member can properly exert optical performance. The linear shape of the spacer along the plate surface of the second optical member is advantageous in forming the spacer between the first optical member and the second optical member in a production of the laminated type optical member. Because the spacer is oriented such the axis of the spacer is tilted relative to the arrangement direction of the pixels, the spacer having the axis is less likely to interfere with the pixels. According to the configuration, fringe patterns that are also referred to as Moire fringes can be reduced. A preferable tilting angle of the axis of the spacer relative to the arrangement direction of the pixel is 3° or greater. If the tilting angle is smaller than 3°, a sufficient level of fringe reducing effects may not be achieved. The "linear shape" here means that a single spacer is formed in a linear shape or multiple spacers are arranged in line. Namely, the "axis" in this specification may be an axis of a single spacer or an axis of multiple spacers arranged in line.

Preferred embodiments of the laminated type optical member according to the present invention may include the following configurations.

(1) The spacer may be formed in a linear shape along the axis. According to the configuration, a forming die for forming the spacer with the die can be easily produced. Therefore, the laminated type optical member can be easily produced. Furthermore, heights of the spacers are more likely to be equalized. This configuration is preferable for equalizing the gap between the first optical member and the second optical member with the plate surface. Still furthermore, the spacers can exert a larger bonding force between the first optical member and the second optical member.

(2) The spacers may extend for an entire length of the second optical member. According to the configuration, the laminated type optical member can be further easily produced. Furthermore, the heights of the spacers are more likely to be equalized. Still furthermore, the spacers can exert a further larger bonding force between the first optical member and the second optical member.

(3) The spacers may include linear unit spacers that extend along the axes. The linear unit spacers may be arranged along the axes. According to the configuration, an air layer is provided between the adjacent linear unit spacers. Therefore, the second optical member can exert a further higher level of optical performance. Furthermore, higher flexibility is achieved in design regarding lengths of the liner unit spacers. Therefore, a sufficient size of the air layer can be provided between the first optical member and the second optical member while maintaining a sufficiently large bonding force between the first optical member and the second optical member with the spacers. According to the configuration, the optical performance of the second optical member is assured.

(4) The spacers may include point unit spacers that may be dots on a plane of the plate surface of the second optical member. The point unit spacers may be linearly arranged along the axes. According to the configuration, an air layer is provided between the adjacent point unit spacers. Therefore, the second optical member can exert a further higher level of optical performance. Furthermore, higher flexibility is achieved in design regarding distribution density of the point unit spacers. Therefore, a sufficient size of the air layer can be provided between the first optical member and the second optical member while maintaining a sufficiently large bonding force between the first optical member and the second optical member with the spacers. According to the configuration, the optical performance of the second optical member is assured.

(5) The second optical member may include a base having a sheet shape and a lens portion including unit lenses formed on a plate surface of the base on a first optical member side and arranged along a direction that crosses at least the axes. The spacers may be arranged at intervals in the direction that crosses the axes. Each of the intervals is larger than an interval of the unit lens in the direction that crosses the axis. According to the configuration, the unit lenses that face an air layer are provided between the spacers that are arranged at intervals in the direction that crosses the axes. A difference in refractive index is created between the unit lenses and the air layer. Therefore, the lens portion can properly exert optical performance.

(6) The spacers may be arranged such that multiple unit lenses are sandwiched between the spacers adjacent to each other in the direction that crosses the axes. According to the configuration, the unit lenses that face an air layer are provided between the spacers that are arranged at intervals in the direction that crosses the axes. A difference in refractive index is created between the unit lenses and the air layer. Therefore, the lens portion can properly exert optical performance.

(7) The spacers may be made of a material the same as a material of at least a portion of the second optical member on a first optical member side. The spacers are formed with the at least a portion of the second optical member on the first optical member side. This configuration is preferable for reducing the production cost.

(8) The second optical member may include a base having a sheet shape and a lens portion formed on a plate surface of the base on the first optical member side. The spacers may be made of a material the same as a material of the lens portion. According to the configuration, the spacers can be formed in a process of forming the lens portion on the base. This configuration is preferable for reducing the production cost.

(9) The spacers and the at least a portion of the second optical member on the first optical member side may be made of an ultraviolet curable resin material. In the production, the spacers and the at least a portion of the second optical member on the first optical member side may be formed using a die and cured with ultraviolet rays.

(10) The laminated type optical member may further include a third optical member and a second spacer. The third optical member may be disposed on an opposite side from a second optical member side relative to the first optical member or an opposite side from a first optical member side relative to the second optical member with a gap between the first optical member and the third optical member to overlap the first optical member or between the second optical member and the third optical member to overlap the second optical member. The second spacer may be provided between the first optical member and the third optical member or the second optical member and the third optical member to hold the gap to form a second air layer. The second spacer may be formed in a linear shape along a plate surface of the first optical member of the third optical member and oriented such that an axis of the second spacer is tilted at an angle equal to or greater than 3° relative to an arrangement direction of the pixels and relative to the axes of the spacers. According to the configuration, the second air layer is formed between the first optical member and the third optical member of the second optical member and the third optical member with the second spacer. Therefore, a difference in refractive index is created between the first optical member and the second air layer or between the third optical member and the second air layer. According to the configuration, the first optical member or the third optical member can properly exert optical performance. The linear configuration of the second spacer along the plate surface of the first optical member or the third optical member is advantageous in forming the second spacer between the first optical member and the third optical member or between the second optical member and the third optical member in production of the laminated type optical member. Because the second spacer is oriented such that the axis of the second spacer is tilted at an angle equal to or greater than 3° relative to an arrangement direction of the pixels and relative to the axes of the spacers, the second spacer is less likely to interfere with the pixels and the spacers. Therefore, fringe patterns that are also referred to as the Moire fringes can be properly reduced. If the tilting angle of the axis of the second spacer relative to the arrangement direction of the pixels and the axes of the spacers is smaller than 3°, a sufficient level of fringe reduction effects cannot be achieved.

To solve the problem described earlier, a lighting device according to the present invention includes the laminated type optical member described above and a light source configured to apply light to the laminated type optical member. According to the lighting device having such a configuration, because the laminated type optical member properly exerts the optical performance, the lighting device can emit proper light.

To solve the problem described earlier, a display device according to the present invention includes the lighting device described above and a display panel including the pixels configured to display an image using light from the lighting device. According to the display device having such a configuration, because the lighting device emits properly light, the image is displayed with high display quality.

As an embodiment of the display device, the display panel may be configured as the first optical member. According to the display device having such a configuration, the first optical member of the laminated type optical member is configured as the display panel. This configuration is preferable for reducing the production cost or the thickness of the device.

To solve the problem described earlier, a television device according to the present invention includes the display device described above. According to the television device, because the high display quality is achieved by the display device, a television image is displayed with high display quality.

Advantageous Effect of the Invention

According to the present invention, optical performance can be properly exerted.

BRIEF DESCRIPTION OF THE DRAWINGS

FIG. 24 is a cross sectional view illustrating a cross sectional configuration of the liquid crystal display device along a short dimension thereof.

MODE FOR CARRYING OUT THE INVENTION

First Embodiment

A first embodiment of the present invention will be described with reference to FIGS. 1 to 10. In this section, a liquid crystal display device 10, a backlight unit 12 used in the liquid crystal display device 10, and a laminated type optical sheet 22 in the backlight unit 12 used in the liquid crystal display device 10 will be described. An X-axis, a Y-axis, and a Z-axis are present in some drawings for the purpose of illustration. The axes in each drawing correspond to the respective axes in other drawings. An upper side and a lower side in FIGS. 4 and 5 correspond to a front side and a rear side of the liquid crystal display device 10, respectively.

Figure 1:
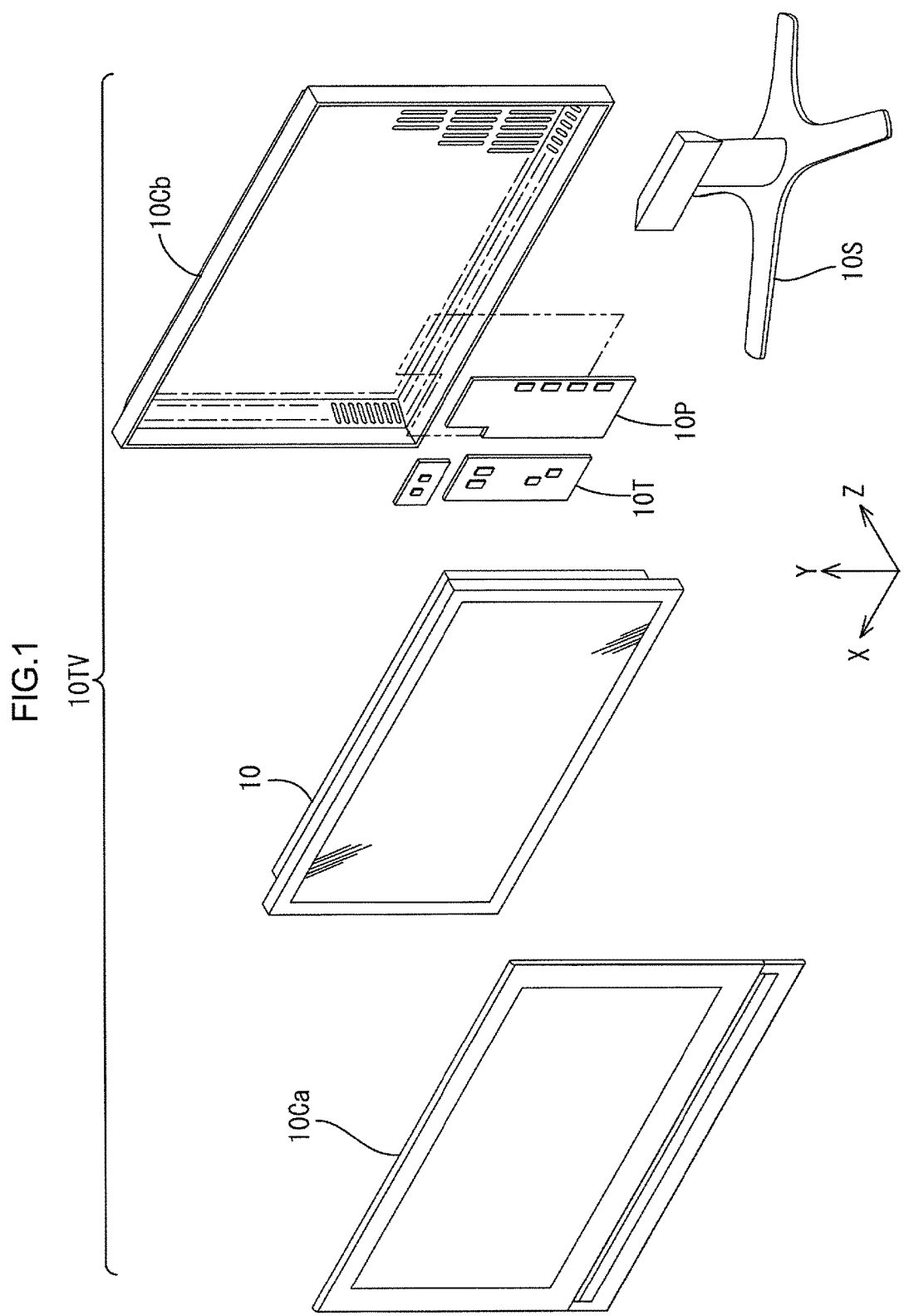
FIG. 1 is an exploded perspective view illustrating a general configuration of a television device according to a first embodiment of the present invention.
Figure 2:
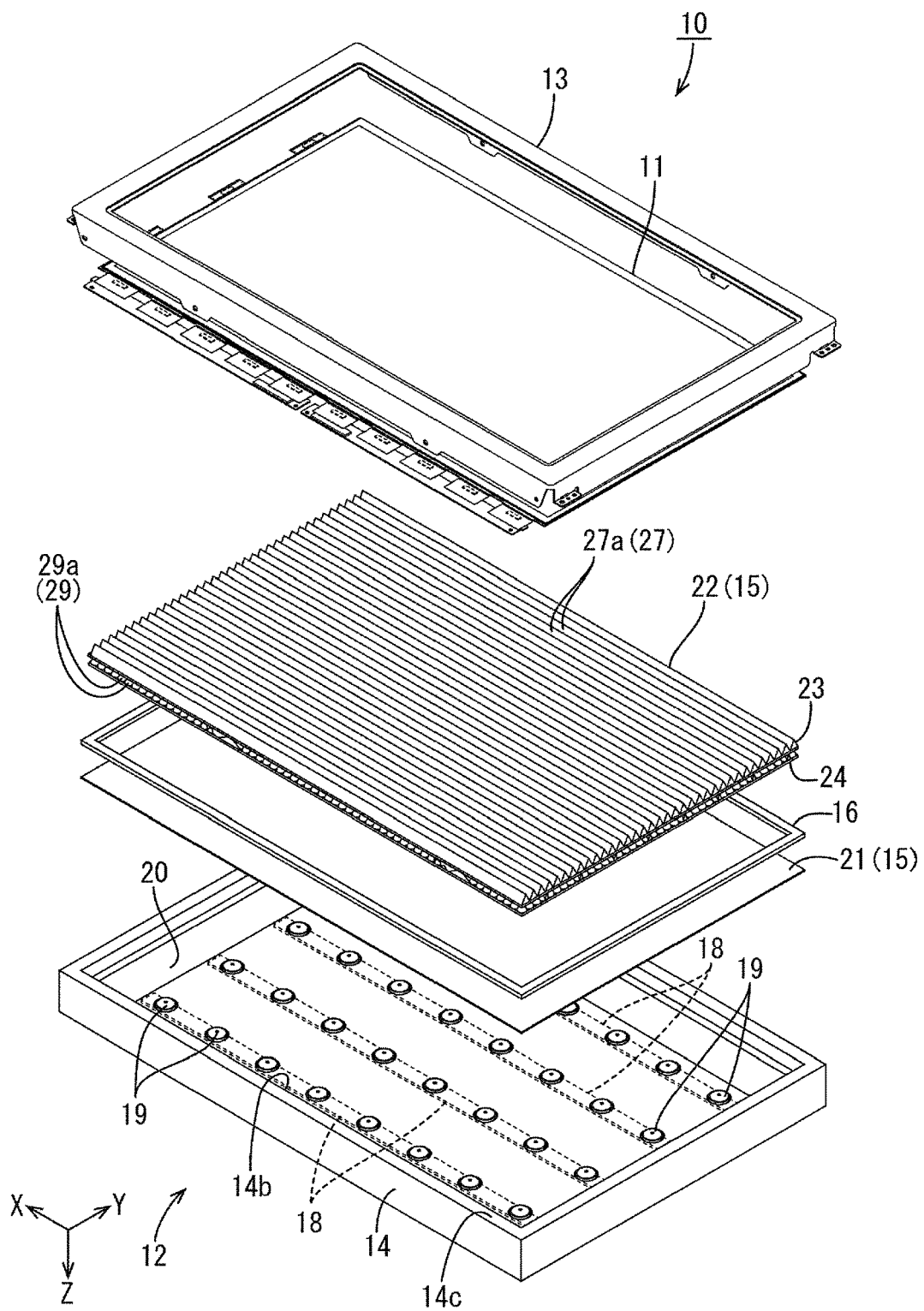
FIG. 2 is an exploded perspective view illustrating a general configuration of a liquid crystal display device included in the television device.

As illustrated in FIG. 1, a television device 10TV according to this embodiment includes the liquid crystal display device 10, a front cabinet 10Ca, a rear cabinet 10Cb, a power supply 10P, a tuner 10T (a receiver), and a stand 10S. The front cabinet 10Ca and the rear cabinet 10Cb sandwich the liquid crystal display device 10 to hold the liquid crystal display device 10. The tuner 10T is configured to receive TV signals. The liquid crystal display device 10 (the display device) has a horizontally-long rectangular overall shape elongated in the horizontal direction. The liquid crystal display device 10 is held in a vertical position. As illustrated in FIG. 2, the liquid crystal display device 10 includes a liquid crystal panel 11 and the backlight unit 12 (the lighting device). The liquid crystal panel 11 is a display panel configured to display images. The backlight unit 12 is an external light source configured to supply light for image display to the liquid crystal panel 11. A bezel 13 having a frame shape collectively holds the liquid crystal panel 11 and the lighting unit 12.

Next, the liquid crystal panel 11 and the backlight unit 12 included in the liquid crystal display device 10 will be described in sequence. The liquid crystal panel 11 (the display panel) has a horizontally-long rectangular shape in a plan view. The liquid crystal panel 11 includes a pair of glass substrates and a liquid crystal layer (not illustrated). The glass substrates are separated from each other with a predefined gap and bonded to each other. The liquid crystal layer is sealed between the glass substrates. The liquid crystal layer includes liquid crystals having optical properties that vary according to application of an electric filed. On one of the glass substrates (an array substrate, an active matrix substrate), switching components (e.g., TFTs) and pixel electrodes are two-dimensionally arranged in a matrix and an alignment film is formed. The switching components are connected to source lines and gate lines that are perpendicular to one another. The pixel electrodes are disposed in rectangular areas defined by the source lines and the gate lines and connected to the switching components. On the other glass substrate (a counter substrate, a CF substrate), color filters, a light blocking layer (a black matrix), counter electrodes, and an alignment films are formed. The color filters include red (R), green (G), and blue (B) color portions two-dimensionally arranged in a matrix with predefined arrangement. The light blocking layer is formed in a grid solid pattern among the color portions to be opposed to the pixel electrodes. Polarizing plates are disposed on outer surfaces of the glass substrates. Long sides of the liquid crystal panel 11 are along the X-axis direction and short sides of the liquid crystal panel 11 are along the Y-axis direction. Furthermore, a thickness of the liquid crystal panel 11 measures in the Z-axis direction.

Figure 6:
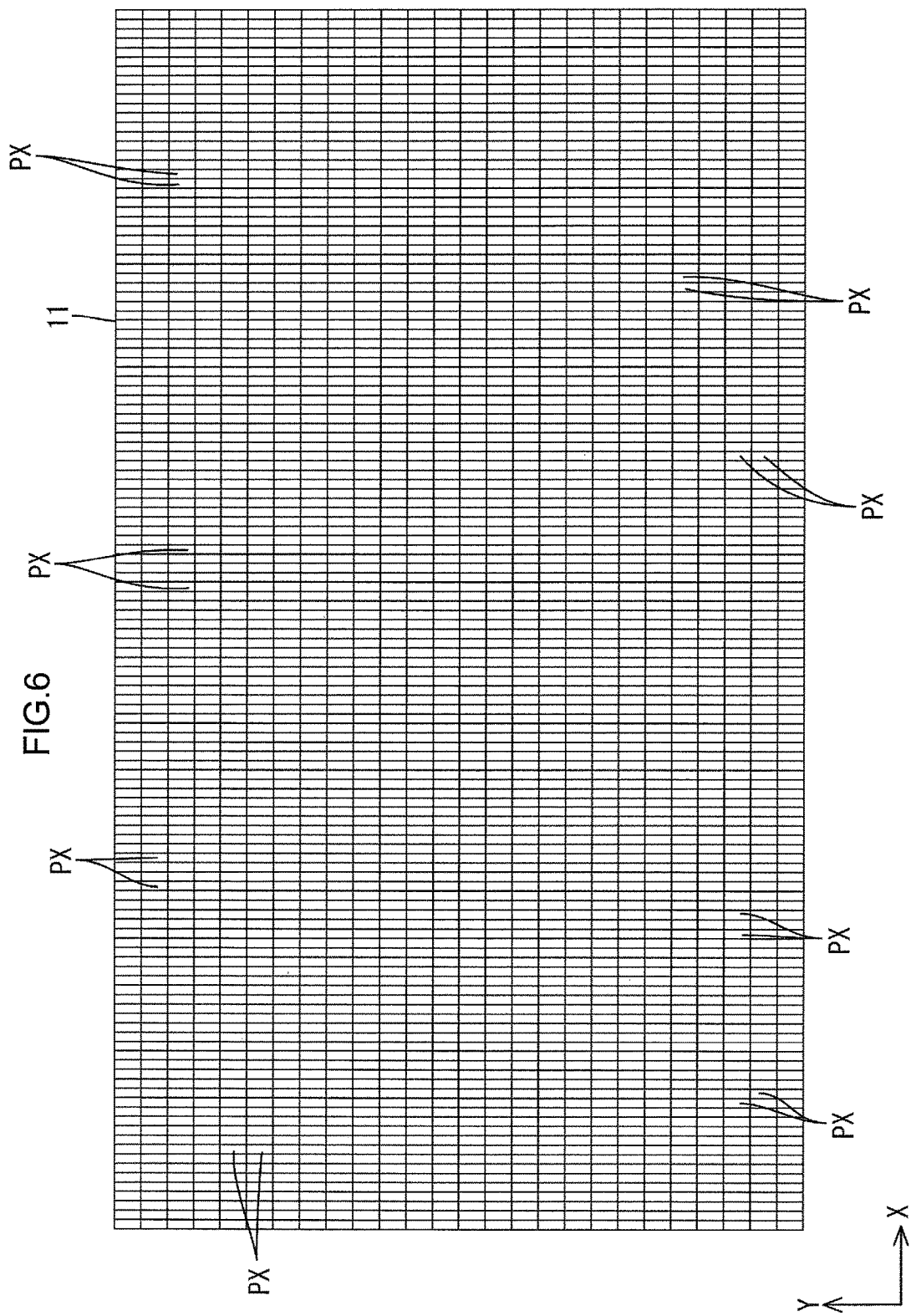
FIG. 6 is a plan view schematically illustrating an arrangement of pixels in a liquid crystal panel.

In the liquid crystal panel 11, each of three color portions of red (R), green (G), and blue (B) and each of three pixel electrodes opposed to the color portions form one group that is a display pixel 11PX (a pixel). The display pixel 11PX is a display unit. As illustrated FIG. 6, groups are two-dimensionally arranged in a matrix along plate surfaces of the substrates, that is, along a display surface (the X-axis direction and the Y-axis direction). Display pixels 11PX include red pixels including R color portions, green pixels including G color portions, and blue pixels including B color portions. The color pixels (unit pixels) are repeatedly arranged on the plate surface of the liquid crystal panel 11 along a row direction (the X-axis direction) to form lines of pixels. The lines of pixels are arranged along a column direction (the Y-axis direction). Namely, the display pixels 11PX are arranged parallel to one another along the X-axis direction and the Y-axis direction with predefined periodicity to form a periodic structure. The arrangement directions of the display pixels 11PX correspond with the X-axis direction and the Y-axis direction. Specifically, the display pixels 11PX in each color are arranged at intervals of about 50 μm. FIG. 6 schematically illustrates the arrangement of the display pixels 11PX in the display panel 11.

Figure 12:
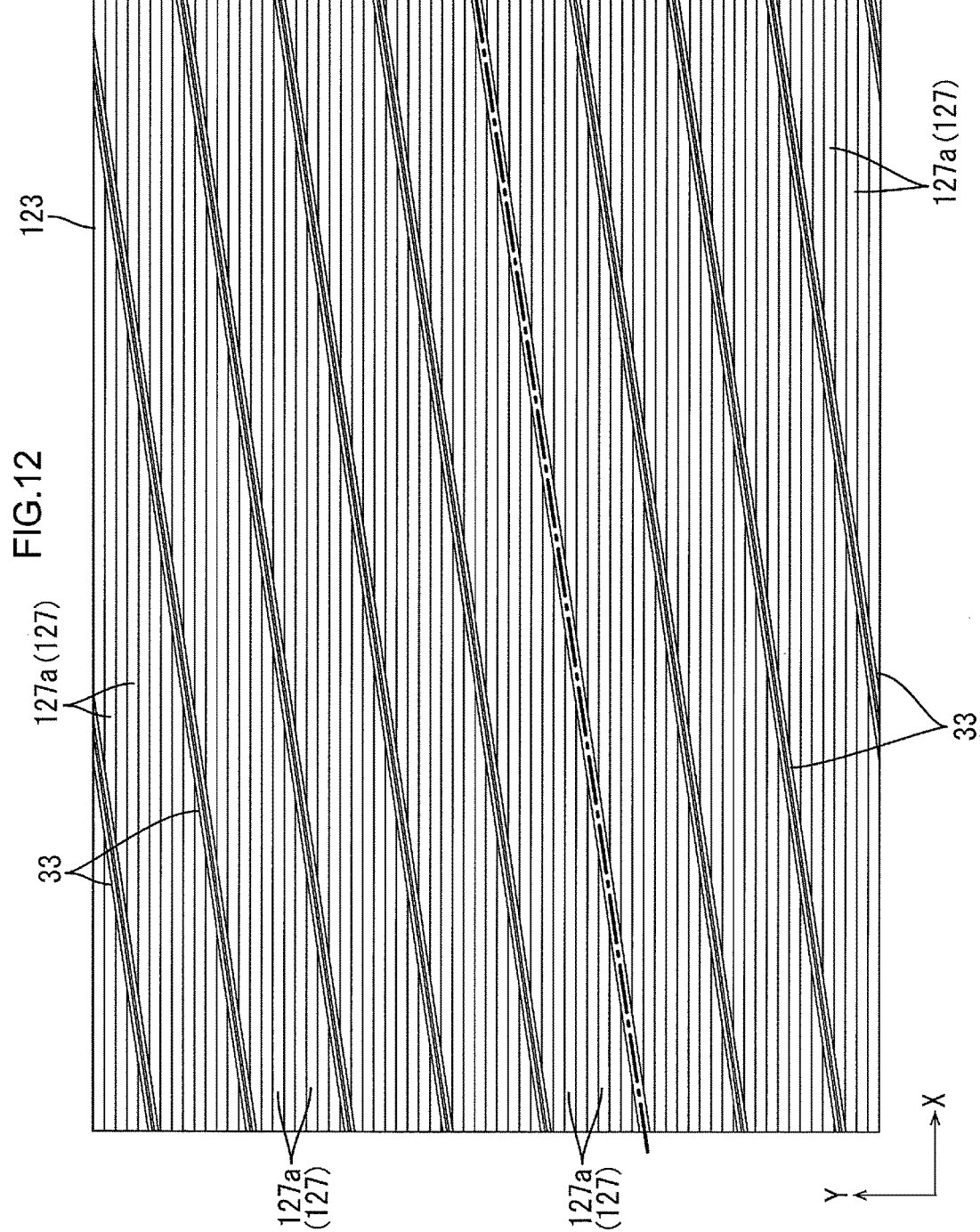
FIG. 12 is a plan view of a prism sheet included in the laminated type optical sheet.

Next, the backlight unit 12 will be described in detail. As illustrated in FIG. 12, the backlight unit 12 includes a chassis 14, optical members 15, and a frame 16. The chassis 14 has a substantially box shape with a light exiting portion 14b that includes an opening on the front side (a light exiting side, a liquid crystal panel 11 side). The optical members 15 are disposed to cover the light exiting portion 14b of the chassis 14. The frame 16 is disposed between edge portions of the optical members 15. In the chassis 14, LEDs 17 (light sources), LED boards 18, diffuser lenses 19 (light sources), and a reflection sheet 20 (a reflection member) 20 are disposed. The LEDs 17 are mounted on the LED boards 18. The diffuser lenses 19 are mounted at positions corresponding to the LEDs 17. The reflection sheet 20 is configured to reflect light rays inside the chassis 14. In the backlight unit 12 in this embodiment, the LEDs 17 are disposed below the liquid crystal panel 11 and the optical members 15 such that light emitting surfaces 17a are opposed to the liquid crystal panel 11 and the optical members 15. The components of the backlight unit 12 will be described in detail.

Figure 3:
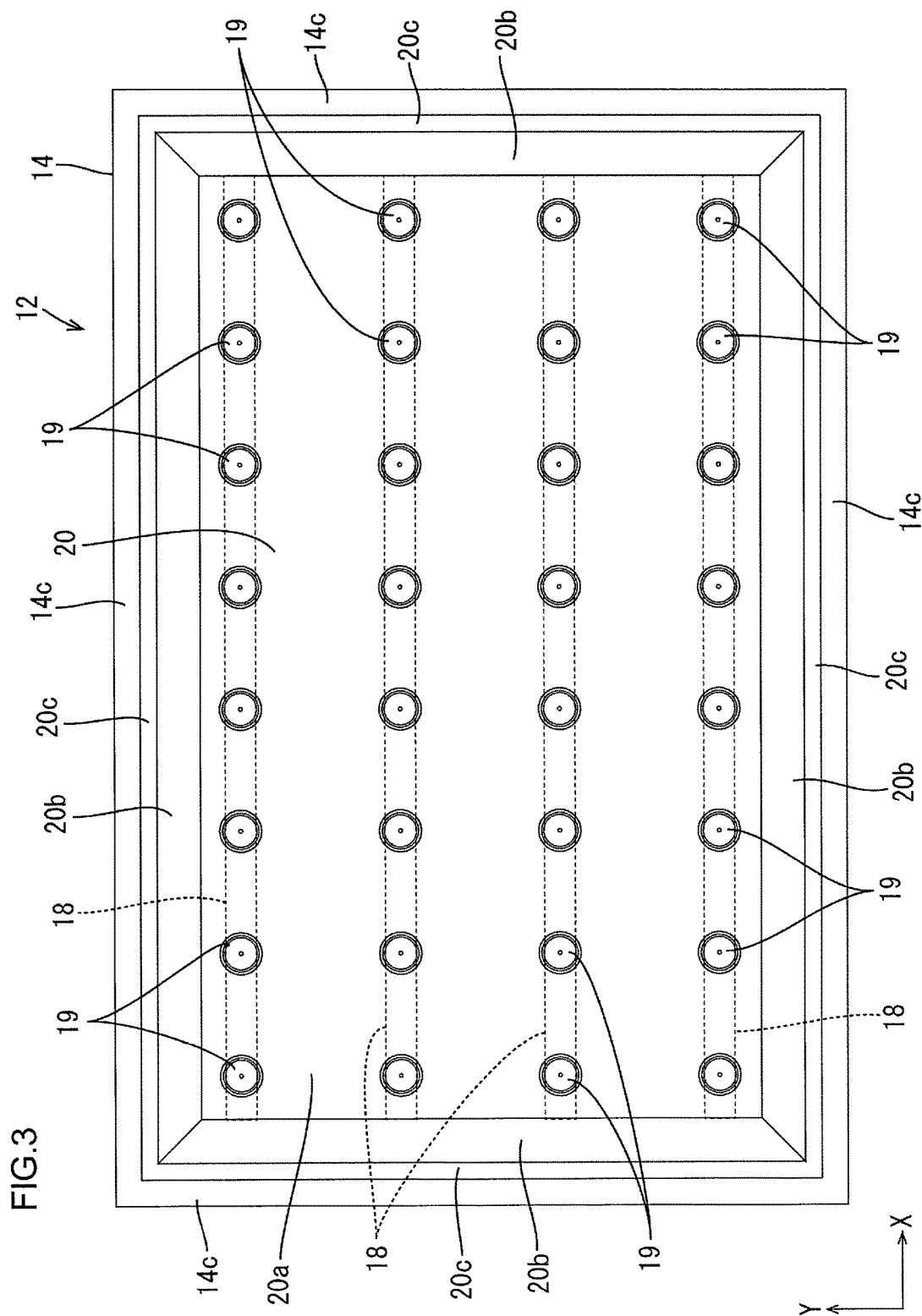
FIG. 3 is a plan view of a backlight unit included in the liquid crystal display device.
Figure 4:
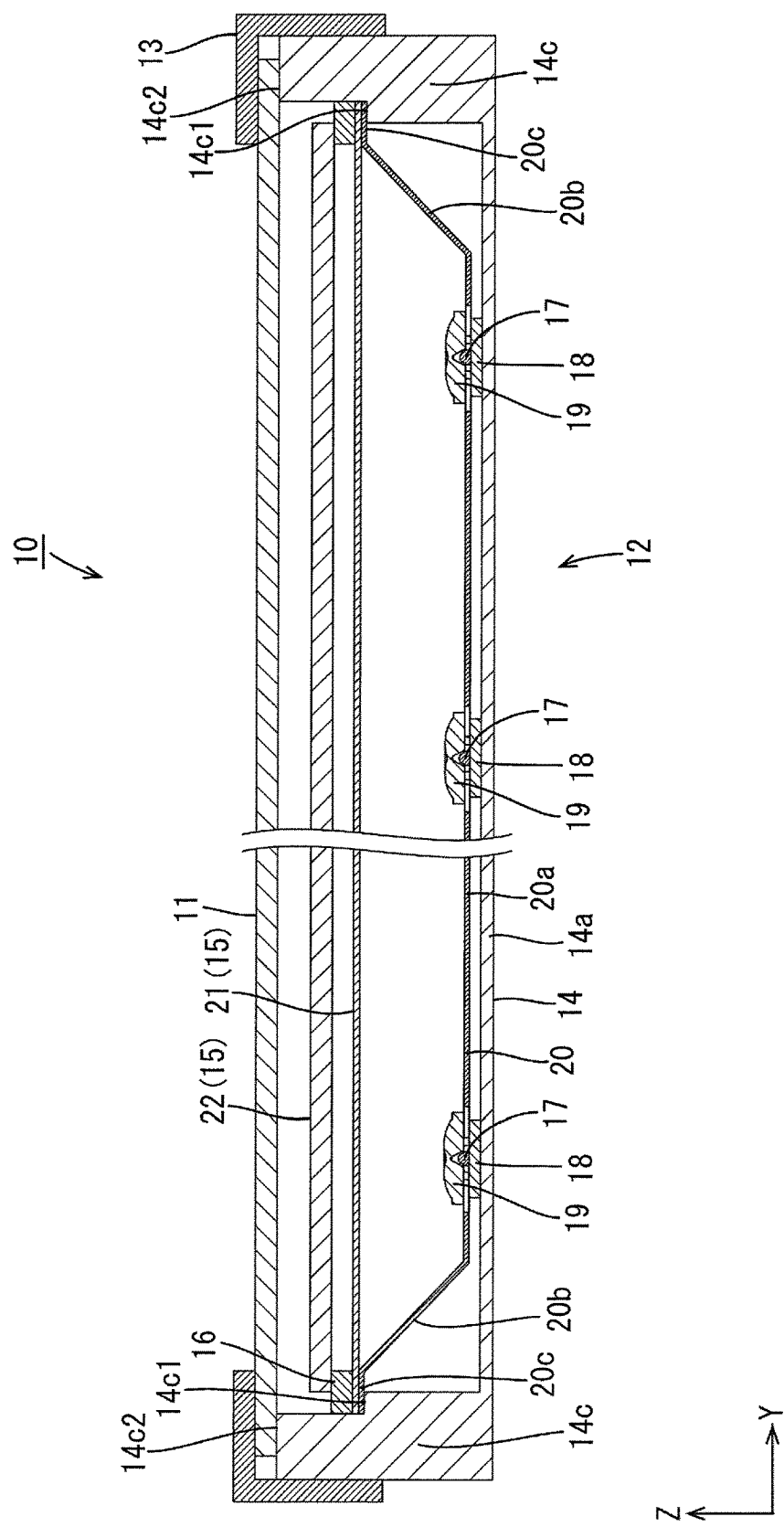
FIG. 4 is a cross sectional view illustrating a cross sectional configuration of the liquid crystal display device along a short dimension thereof.
Figure 5:
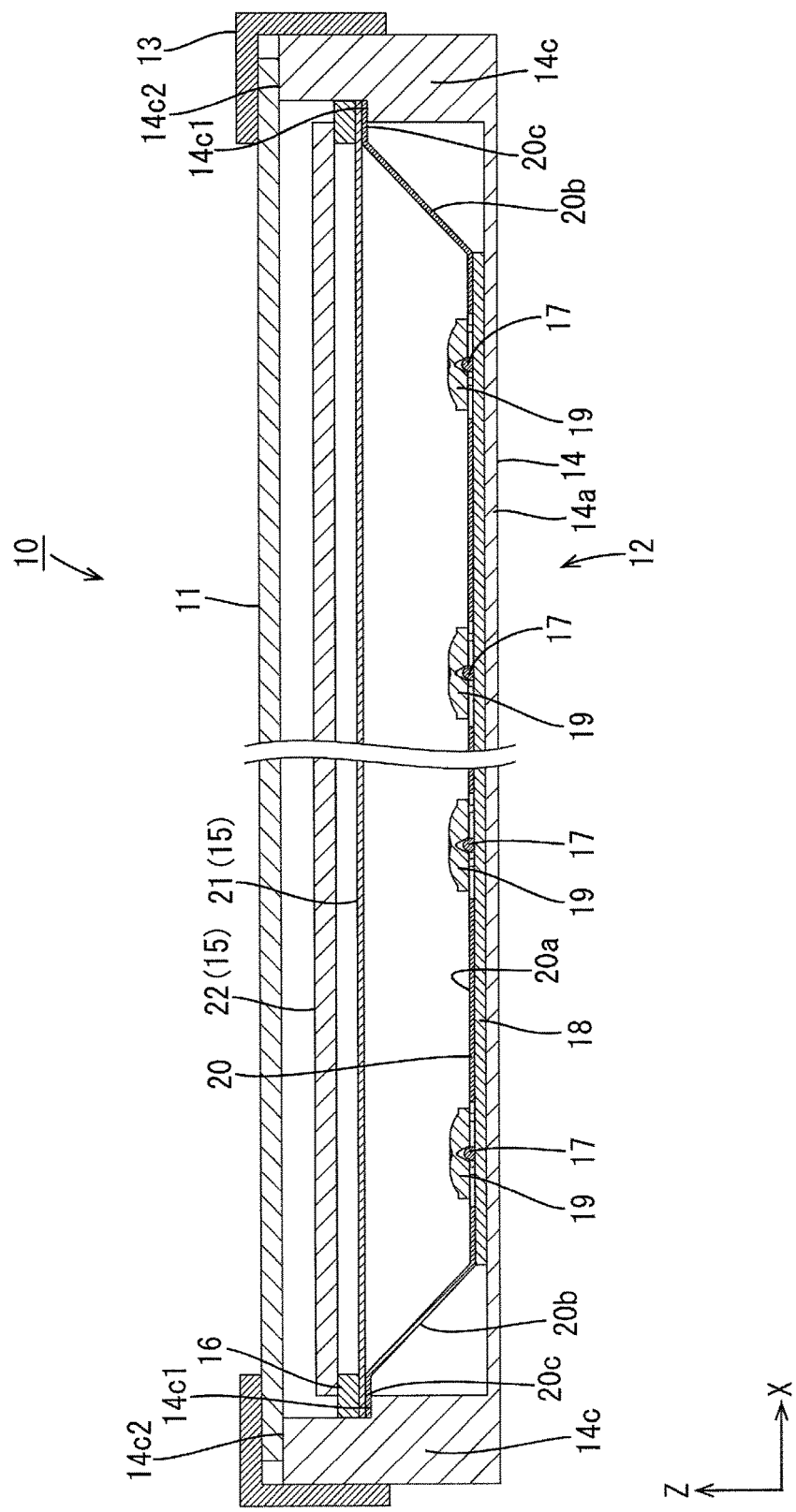
FIG. 5 is a cross sectional view illustrating a cross sectional configuration of the liquid crystal display device along a long dimension thereof.

The chassis 14 is made of a synthetic resin material. As illustrated in FIGS. 3 to 5, the chassis 14 includes a bottom portion 14a and side portions 14c. The bottom portion 14a has a horizontally-long rectangular shape similar to the shape of the liquid crystal panel 11. The side portions 14c project from outer edges of the bottom portion 14a to the front side (the light exiting side), respectively. An overall shape of the chassis 14 is a shallow box shape (a tray shape). The long edges and the short edges of the chassis 14 are along the X-axis direction and the Y-axis direction, respectively. The bottom portion 14a of the chassis 14 is disposed behind the LED boards 18, that is, on an opposite side from a light emitting surface 17a side (the light exiting side). The side portions 14c of the chassis 14 forma frame shape with a small height as a whole. Each side portion 14c has a stepped cross section. The side portions 14c include first steps 14c1 on a lower side and second steps 14c2 on an upper side. Edge portions of the optical members 15 (specifically, a diffuser plate 21) and the reflection sheet 20, which will be described later, are placed on the first steps 14c1. Edge portions of the liquid crystal panel 11 are placed on the second steps 14c2. The frame 16 and the bezel 13 are fixed to the side portions 14c.

As illustrated in FIG. 2, the optical members 15 have a horizontally-long rectangular shape similar to the shapes of the liquid crystal panel 11 and the chassis 14 in the plan view. The optical members 15 include the diffuser plate 21 and the laminated type optical sheet 22 (a laminated type optical member). The diffuser plate 21 is disposed more to the rear (closer to the LEDs 17, away from the light exiting side) in comparison to other optical members 15. The laminated type optical sheet 22 is disposed more to the front (closer to the liquid crystal panel 11, on the light exiting side). As illustrated in FIGS. 4 and 5, the edge portions of the diffuser plate 21 are placed on the first steps 14c1 of the side portions 14c to cover the light exiting portion 14b of the chassis 14. The diffuser plate 21 is disposed between the laminated type optical sheet 22 and the LEDs 17 and the diffuser lenses 19. The diffuser plate 21 is disposed on the front side relative to the LEDs 17 and the diffuser lenses 19, that is, on the light exiting side to be opposed to the LEDs 17 and the diffuser lenses 19 with a predefined gap. The diffuser plate 21 includes a substantially transparent resin base having a predefined thickness and diffuser particles dispersed in the base. The diffuser plate 21 has a function for diffusing light rays passing therethrough. The edge portions of the laminated type optical sheet 22 are placed on the frame 16 to cover the light exiting portion 14b of the chassis 14. The laminated type optical sheet 22 is disposed between the liquid crystal panel 11 and the diffuser plate 21. A detailed configuration of the laminated type optical sheet 22 will be described later.

As illustrated in FIG. 2, the frame 16 has a frame shape along the edge portions of the liquid crystal panel 11 and the optical members 15. The frame 16 has a block shaped cross section. As illustrated in FIGS. 4 and 5, the frame 16 is placed on the edge portions of the diffuser plate 21 which are placed on the first steps 14c1 of the side portions 14c to press the edge portions of the diffuser plate 21 and the reflection sheet 20, which will be described later, from the front side. The outer edge portions of the diffuser plate 21 and the reflection sheet 20 are sandwiched between the frame 16 and the first steps 14c1. The edge portions of the laminated type optical sheet 22 are placed on the frame 16. According to the configuration, a predefined gap is maintained between the laminated type optical sheet 22 and the diffuser plate 21. According to the frame 16 having such a configuration, a holding force applied to the laminated type optical sheet 22 in a thickness direction thereof is smaller than a holding force applied to the diffuser plate 21 in a thickness direction thereof. Therefore, variations in size of the laminated type optical sheet 22 due to thermal expansion and thermal contraction of the laminated type optical sheet 22 can be accommodated. Wrinkles are less likely to be produced due to the variations in size of the laminated type optical sheet 22. Furthermore, the edge portions of the laminated type optical sheet 22 placed on the frame 16 overlap the frame 16 and the edge portions of the diffuser plate 21 in the plan view. In comparison to a configuration in which a laminated type optical sheet is directly placed on the diffuser plate 21 that is pressed by the frame 16 from the front side, the edge portions of the diffuser plate 21 are located outer. This configuration is preferable for reducing a frame size.

Figure 7:
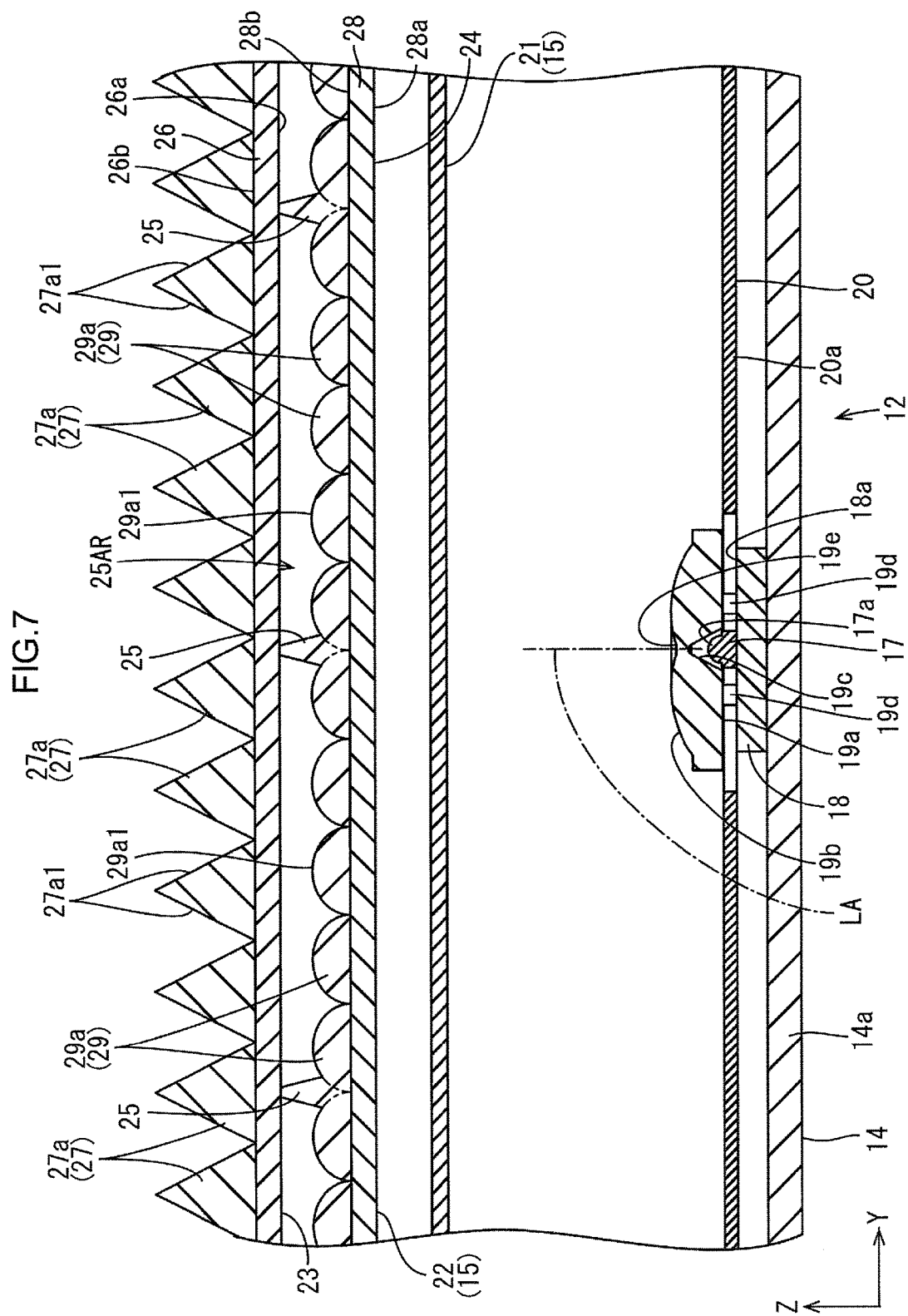
FIG. 7 is a cross sectional view illustrating a cross sectional configuration of the backlight unit along a short dimension thereof.

Next, the LEDs 17 and the LED boards 18 on which the LEDs 17 are mounted will be described. As illustrated in FIGS. 4, 5, and 7, the LEDs 17 are surface-mounted on the LED boards 18 with the light emitting surfaces 17a facing the opposite side from the LED board 18 side. Namely, the LEDs 17 are top surface emitting type LEDs. An optical axis LA of each LED 17 is along the Z-axis direction, that is, a direction normal to the display surface of the liquid crystal panel 11 (the plate surface of the optical member 15). In FIG. 7, the optical axis LA is indicated by a chain line. The "optical axis" here is an axis that corresponds with a travel direction of a light ray with the highest emitting intensity (a peak) in light emitted by each LED 17.

As illustrated in FIGS. 3 to 5, each LED board 18 has a horizontally-long rectangular shape. The LED boards 18 are held in the chassis 14 with the long edges (a length direction) along the X-axis direction and the short edges (a width direction) along the Y-axis direction to extend along the bottom portion 14a. The bases of the LED boards 18 are made of metal, for example, an aluminum-based material that is the same as the material of the chassis 14. Wiring traces (not illustrated) are formed on surfaces of the bases of the LED boards 18 via insulating layers. The wiring traces may be formed from metal films such as copper foils. Reflection layers (not illustrated) exhibiting white color are formed on the outermost surfaces. Light rays emitted by the LEDs 17 and returned to the LED boards 18 are reflected by the reflection layers. The reflected light rays are directed to the front side and included in emitting light. An insulating material such as a ceramic material may be used for the bases of the LED boards 18. The LEDs 17 are surface-mounted on plate surfaces of the LED boards 18 facing the front side (plate surfaces facing the optical member 15 side), that is, the plate surfaces are mounting surfaces 18a. The LEDs 17 are arranged in lines along the long edges of the LED boards 18 (the X-axis direction). The LEDs 17 in each line are connected in series with the trace formed on the corresponding LED board 18. Specifically, eight LEDs 17 are linearly arranged at intervals on the LED board 18. The LED boards 18 are arranged parallel to one another along the Y-axis direction with the long edges aligned with one another and the short edges aligned with one another. Specifically, four LED boards 18 are arranged along the Y-axis direction in the chassis 14 and the arrangement direction of the LED boards 18 corresponds with the Y-axis direction. Lines of the LEDs 17 are arranged along the X-axis direction (the row direction, along the long edges of the bottom portion 14a) which corresponds to the longitudinal direction of each LED board 18 within the plate surface of the bottom portion 14a of the chassis 14. Lines of the LEDs 17 are arranged along the Y-axis direction (the column direction, along the short edges of the bottom portion 14a) which corresponds to the arrangement direction of the LED boards 18. Namely, the LEDs 17 are arranged in a matrix. The LED boards 18 include connectors connected to wiring members that are not illustrated. Driving power is supplied from an LED driver circuit board (a light source driver circuit board) which is not illustrated to the LED boards 18 via the wiring members.

The diffuser lenses 19 are made of a substantially transparent synthetic resin material (having high light transmissivity) having a refractive index higher than that of the air (e.g., polycarbonate and acrylic). As illustrated in FIGS. 3 to 5, each diffuser lens 19 has a predefined thickness and a round shape in the plan view. The diffuser lenses 19 are attached to the LED boards 18 to cover the light emitting surfaces 17a of the LEDs 17 from the front side (the light exiting side), respectively. Namely, the diffuser lenses 19 overlap the respective LEDs 17 in the plan view. The number and the two-dimensional arrangement of the diffuser lenses 19 in the backlight unit 12 have the same relationship between the number and the two-dimensional arrangement of the LEDs 17. Light emitted by each LED 17 has high directivity. The light is diffused by the corresponding diffuser lens 19 and exits from the diffuser lens 19. Namely, the directivity of the light emitted by the LED 17 is reduced when passing through the diffuser lens 19. Therefore, even if the interval between the adjacent LEDs 17 is large, the area between the adjacent LEDs 17 is less likely to be recognized as a dark area. According to the configuration, the number of the LEDs 17 can be reduced. The diffuser lenses 19 are disposed substantially concentrically with the respective LEDs 17 in the plan view.

As illustrated in FIG. 7, surfaces of the diffuser lenses 19 facing the rear side and opposed to the LED boards 18 (the LEDs 17) are light entering surfaces 19a through which the light rays from the LEDs 17 enter. Surfaces of the diffuser lenses 19 facing the front side and opposed to the optical member 15 are light exiting surfaces 19b through which the light rays exit. The light entering surfaces 19a are substantially parallel to the plate surfaces of the LED boards 18 (the X-axis direction and the Y-axis direction). The light entering surfaces 19a have light entering-side recesses 19c in areas that overlap the LEDs 17 in the plan view to provide sloped surfaces that are sloped relative to the optical axes LA of the LEDs 17. Each light entering-side recess 19c has a cone-like shape with an inverted V shape in a cross sectional view. The light entering-side recesses 19c are substantially concentrically with the diffuser lenses 19. The light rays emitted by the LEDs 17 and entering the light entering-side recesses 19c are refracted by the sloped surfaces in a wide angle range and enter the diffuser lenses 19. Mounting legs 19d project from the light entering surfaces 19a. The mounting legs 19d are mounting structures for the LED boards 18. Each light exiting surface 19b is a gentle spherical surface to refract the light rays from each diffuser lens 19 in a wide angle range to exit. In an area of the diffuser lens 19 overlapping the corresponding LED 17 in the plan view, a light exiting-side recess 19e having a substantially mortar shape is formed. With the light exiting-side recess 19e, most of the light rays from the LED 17 are refracted in a wide angle range to exit.

The reflection sheet 20 is made of synthetic resin. The reflection sheet 20 has a white surface having high light reflectivity. As illustrated in FIGS. 2 to 5, the reflection sheet 20 has a size to cover about an entire area of the inner surface of the chassis 14. Therefore, the reflection sheet 20 can collectively cover the LED boards 18 in the chassis 14 from the front side (the light exiting side, the optical member 15 side). With the reflection sheet 20, the light rays inside the chassis 14 are reflected toward the front side (the light exiting side, the optical member 15 side). The reflection sheet 20 includes a bottom portion 20a, four raised portions 20b, and extended portions 20c. The bottom portion 20a extends along the bottom portion 14a of the chassis 14 and has a size to cover most of the bottom portion 20a. The raised portions 20b project from outer edges of the bottom portion 20a, respectively. The raised portions 20b are angled to the bottom portion 20a. The extended portions 20c extend outward from outer edges of the raised portions 20b, respectively. The extended portions 20c are placed on the side portions 14c of the chassis 14. The bottom portion 20a of the reflection sheet 20 is disposed on the front side relative to the LED boards 18 to overlap the front surfaces of the LED boards 18, that is, the mounting surfaces of the LED boards 18 on which the LEDs 17 are mounted. The reflection sheet 20 includes through holes at positions corresponding to the diffuser lenses 19 to pass through the diffuser lenses 19.

Next, the configuration of the laminated type optical sheet 22 will be described in detail. As illustrated in FIG. 7, the laminated type optical sheet 22 includes a prism sheet 23 (a first optical member), a micro lens sheet 24 (a second optical member), and spacers 25. The prism sheet 23 is disposed on the front side (the light exiting side) relative to others. The micro lens sheet 24 is disposed on the rear side (the opposite side from the light exiting side, the light entering side) relative to others to overlap the prism sheet 23 with a gap between the prism sheet 23 and the micro lens sheet 24. The spacers 25 are disposed to hold the gap between the prism sheet 23 and the micro lens sheet 24 and to hold an air layer 25AR. The prism sheet 23 has light collecting anisotropic property to selectively exert light collecting effects on the light rays from the rear side (the light entering side, the micro lens sheet 24 side) in a specific direction as optical effects. The micro lens sheet 24 has light collecting isotropic property to exert light collecting effects on the light rays from the rear side (the light entering side, the diffuser plate 21 side) in all directions as optical effects. According to the laminated type optical sheet 22, in comparison to a configuration in which separate prism sheet and micro lens sheet are placed on top of each other, an overall thickness is larger than the thickness of each sheet and thus higher strength can be achieved. Therefore, even if uneven thermal distribution or uneven humidity distribution occurs in the plate surface, deformations such as wrinkles are less likely to occur. Namely, the laminated type optical sheet 22 has high thermal resistance and high moisture resistance. In the configuration including separate prism sheet and micro lens sheet, thicknesses of the sheet may be set larger than a certain value to prevent the deformations such as wrinkles. In this case, an overall thickness may become large. According to the laminated type optical sheet 22, the overall thickness can be reduced in comparison to the above case. This configuration is preferable for reducing the thickness.

Figure 8:
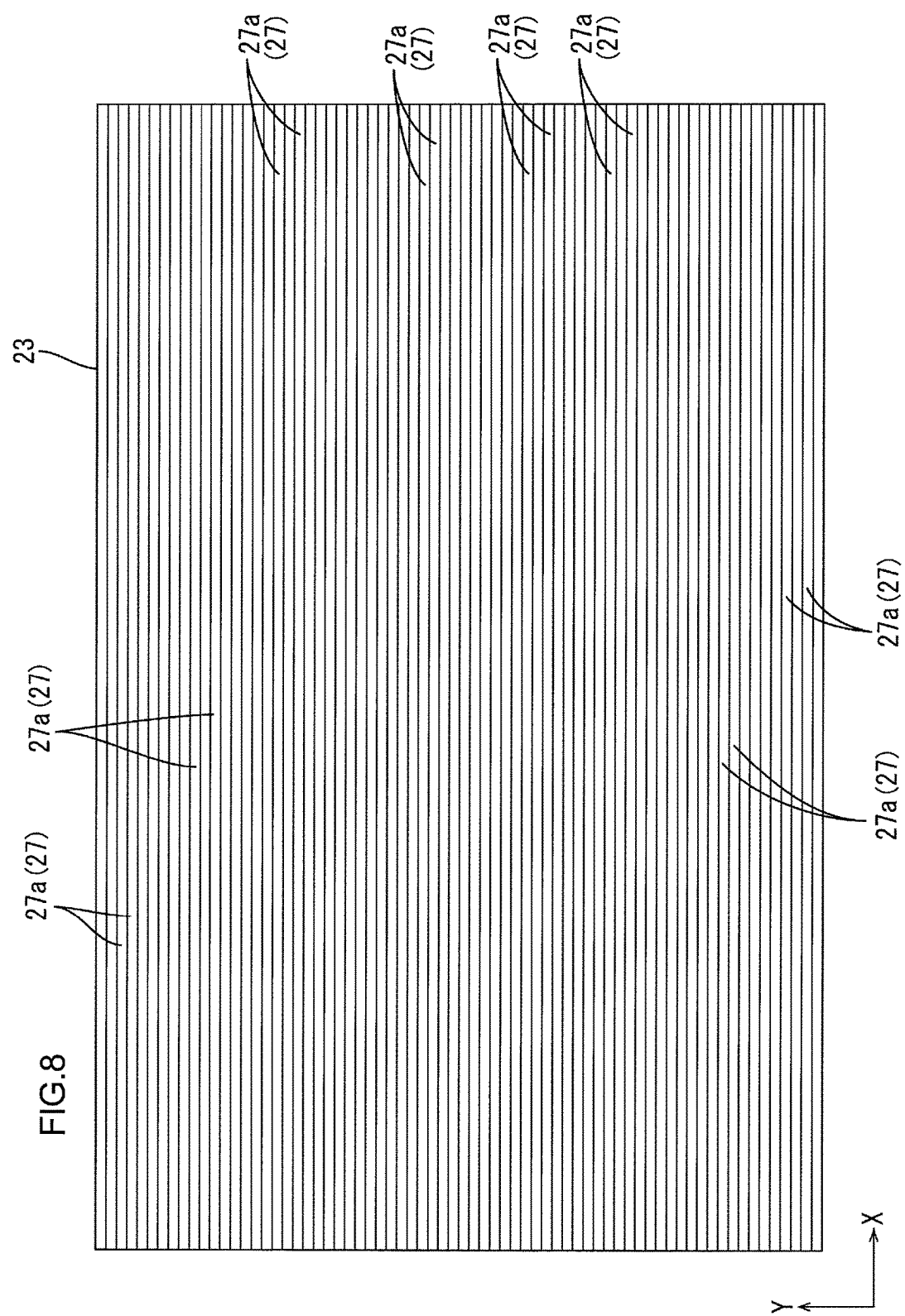
FIG. 8 is a plan view of a prism sheet included in a laminated type optical sheet.

As illustrated in FIGS. 7 and 8, the prism sheet 23 includes a base 26 (a first base) and a prism portion 27 (a first optical functional portion). The base 26 has a sheet shape. The prism portion 27 is formed on a light exiting-side plate surface 26b of the base 26 on an opposite side (the light exiting side) from a light entering-side plate surface 26a of the base 26 through which light rays exiting from the micro lens sheet 24 enter. The base 26 is made of substantially transparent synthetic resin, specifically, a thermoplastic resin material such as PET. A refractive index of the base 26 may be about 1.667. The prism portion 27 is integrally formed with the light exiting-side plate surface 26b of the base 26. The prism portion 27 is made of a substantially transparent ultraviolet curable resin material that is a kind of light curable resin materials. In a production of the prism sheet 23, a forming die is filled with the ultraviolet curable resin material before cured. A forming surface of the die is transferred onto the ultraviolet curable resin material before cured. When the base 26 is placed on an opening end of the die in the above condition, the ultraviolet curable resin material before cured is placed on the light exiting-side plate surface 26b. Then, ultraviolet rays are applied to the ultraviolet curable resin material before cured. As a result, the ultraviolet curable resin material is cured and the prism portion 27 is integrally formed with the base 26. The ultraviolet curable resin material for forming the prism portion 27 may be an acrylic resin material such as PMMA. The refractive index of the ultraviolet curable resin material may be about 1.59. The prism portion 27 includes unit prisms 27a (first unit optical functional sections) which protrude from the light exiting-side plate surface 26b of the base 26 in a normal direction (the Z-axis direction) to the front side (the light exiting side). Each unit prism 27a has a triangular cross section when cut along the Y-axis direction (a direction perpendicular to an extending direction thereof). Each unit prims 27a linearly extends in the X-axis direction (the extending direction). The unit prisms 27a are arranged along the Y-axis direction on the light exiting-side plate surface 26b of the base 26. Namely, each unit prims 27a has a linear shape with an axis along the X-axis direction within the light exiting-side plate surface 26b of the base 26. The width (a dimension measuring in the Y-axis direction) of each unit prism 27a is constant for an entire length in the X-axis direction. Each unit prism 27a has an isosceles triangular cross section. Sloped surfaces 27a1 (sloped faces) of the unit prisms 27a are light exiting surfaces of the prism sheet 23. The unit prisms 27a arranged along the Y-axis direction to be parallel to each other have about the same vertex, width of the bottom surface, and height. Intervals between the adjacent unit prisms 27a are about equal to one another. Specifically, the intervals between the unit prisms 27a are about 50 µm, that is, about equal to the intervals of the pixels (the unit pixels) of the display pixels 11PX of the liquid crystal panel 11.

According to the prism sheet 23 having such a configuration, as illustrated in FIG. 7, when the light rays entering the base 26 through the light entering-side plate surfaces 26a and exiting through the light exiting-side plate surface 26b enter unit prisms 27a, the light rays are refracted at angles corresponding to the incidences and the refractive index of the prism portion 27 at interfaces between the sloped surfaces 27a1 and the air (the air layer) when exiting through the sloped surfaces 27a1 of the unit prisms 27a. The light rays exiting through the sloped surfaces 27a1 of the unit prisms 27a are controlled to travel in directions closer to the frontward direction with respect to the Y-axis direction that is the arrangement direction of the unit prisms 27a. The light collecting effects are selectively exerted on the light rays passed through the prism sheet 23 with respect to the Y-axis direction.

Figure 9:
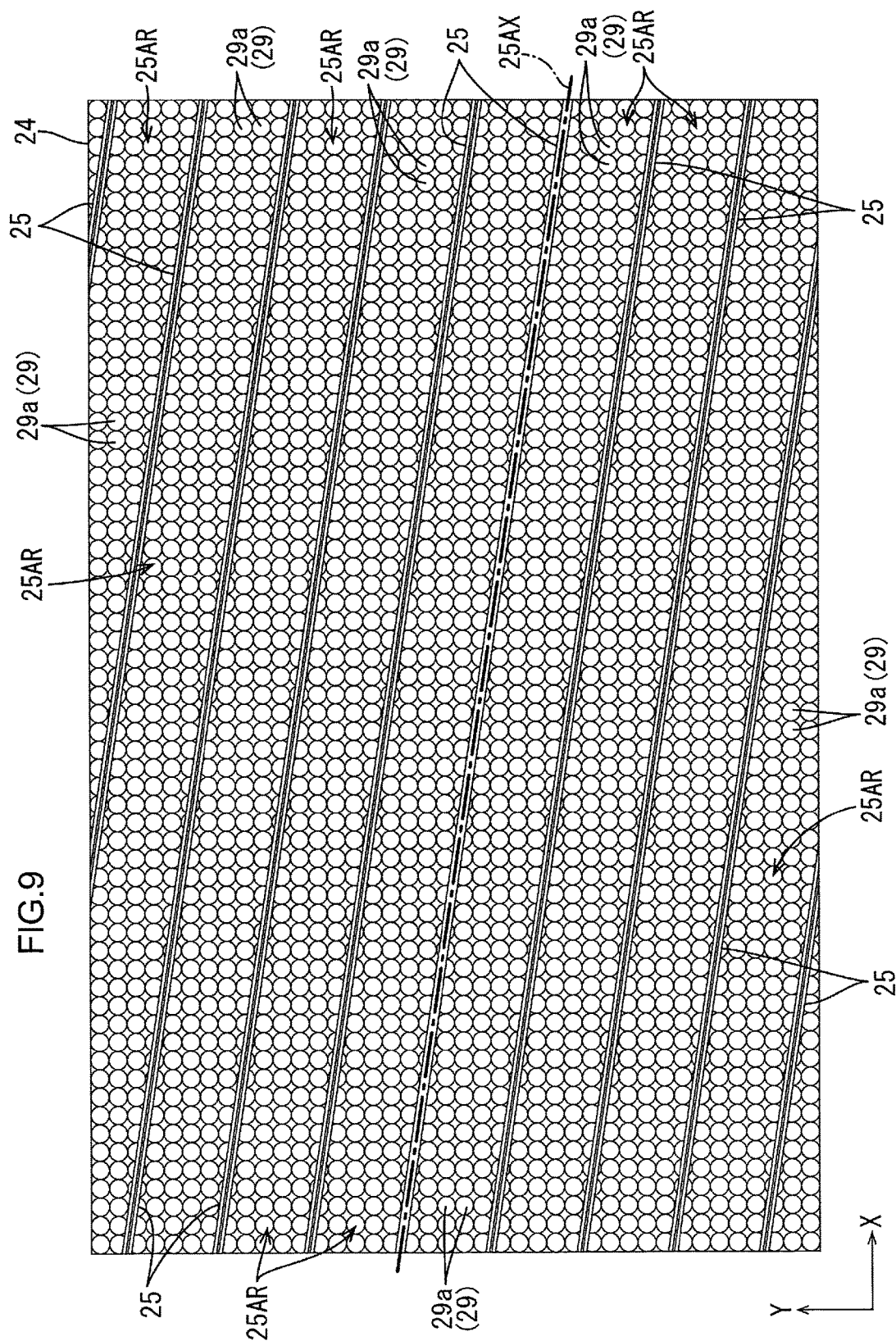
FIG. 9 is a plan view of a micro lens sheet included in a laminated type optical sheet.

As illustrated in FIGS. 7 and 9, the micro lens sheet 24 includes a base 28 (a second base) and a micro lens portion 29 (a lens portion, a second optical functional section). The base 28 has a sheet shape. The micro lens portion 29 is formed on a light exiting-side plate surface 28b of the base 28 on an opposite side (a light exiting side) from a light entering-side plate surface 28a of the base 28 through which light rays exiting from the diffuser plate 21 enter. The base 28 is made of substantially transparent synthetic resin, specifically, a thermoplastic resin material such as PET. The refractive index of the base 28 is about 1.667. The micro lens portion 29 is integrally formed with the light exiting-side plate surface 28b of the base 28. The micro lens portion 29 is made of a substantially transparent ultraviolet curable resin material that is a kind of light curable resin materials. In a production of the micro lens sheet 24, a forming die is filled with the ultraviolet curable resin material before cured. A forming surface of the die is transferred onto the ultraviolet curable resin material before cured. When the base 28 is placed on an opening end of the die in the above condition, the ultraviolet curable resin material before cured is placed on the light exiting-side plate surface 28b. Then, ultraviolet rays are applied to the ultraviolet curable resin material before cured. As a result, the ultraviolet curable resin material is cured and the micro lens portion 29 is integrally formed with the base 28. The ultraviolet curable resin material for forming the micro lens portion 29 may be acrylic resin material such as PMMA. The refractive index of the ultraviolet curable resin material may be about 1.59. The micro lens portion 29 includes unit micro lenses 29a (unit lenses, second unit optical functional sections) which protrude from the light exiting-side plate surface 28b of the base 28 in a normal direction (the Z-axis direction) to the front side (the light exiting side). Each unit micro lens 29a is a convex lens having a round shape in the plan view and a substantially hemisphere overall shape. The unit micro lenses 29a are two-dimensionally arranged in a matrix along the light exiting-side plate surface 28b (the Y-axis direction and the Y-axis direction). Although each unit micro lens 29a is a dot within a plane of the light exiting-side plate surface 28b of the base 28, the unit micro lenses 29a arranged along the X-axis direction and the Y-axis direction form lines. Each unit micro lens 29a has a semicircular cross section when cut along the X-axis direction or the Y-axis direction. A hemisphere surface 29a1 (a sphere surface, an arc surface) of each unit micro lens 29a is configured as a light exiting surface of the micro lens sheet 24. The unit micro lenses 29a arranged along the X-axis direction and the Y-axis direction to be parallel to one another have about the same angle of tangent, curvature of the hemisphere surfaces 29a1, diameter of bottom surfaces, and heights. Intervals between the adjacent unit micro lenses 29a are about equal to one another. Specifically, the intervals between the unit micro lenses 29a are about 50 μm, that is, about equal to the intervals of the pixels (the unit pixels) of the display pixels 11PX of the liquid crystal panel 11 or the intervals of the unit prisms 27a of the prism portion 27 of the prism sheet 23.

According to the micro lens sheet 24 having such a configuration, as illustrated in FIG. 7, when the light rays entering the base 28 through the light entering-side plate surface 28a and exiting through the light exiting-side plate surface 28b enter unit micro lenses 29a of the micro lens portion 29, the light rays are refracted at angles corresponding to the incidences and the refractive index of the micro lens portion 29 at interfaces between the hemisphere surface 29a1 and the air layer 25AR when exiting through the hemisphere surface 29a1 of the unit micro lenses 29a. The light rays exiting through the hemisphere surface 29a1 of the unit micro lenses 29a are controlled to travel in directions closer to the frontward direction with respect to the X-axis direction and the Y-axis direction that are the arrangement directions of the unit micro lenses 29a. The light collecting effects are exerted in an isotropic manner on the light rays passed through the micro lens sheet 24 with respect to the X-axis direction and the Y-axis direction. It is preferable to provide a certain percentage of the unit micro lenses 29a having the hemisphere surfaces 29a1, about entire areas of which face the air layer 25AR, to sufficiently exert the isotropic light collecting function (the optical performance) of the micro lens portion 29.

As illustrated in FIG. 7, the spacers 25 are disposed between the prism sheet 23 and the micro lens sheet 24. The spacers 25 have functions for holding the air layer 25AR and for bonding the prism sheet 23 and the micro lens sheet 24 together to integrate. The spacers 25 are provided with a predefined occupancy rate within plate surfaces of the prism sheet 23 and the micro lens sheet 24 (an area of the spacers 25 over a total area of the plate surface of the prism sheet 23 or the micro lens sheet 24 in the plan view). The reciprocal of the occupancy rate is about equal to an occupancy rate of the air layer 25AR (a rate of the area of the air layer 25AR over the total area of the plate surface of the prism sheet 23 or the micro lens sheet 24). As the occupancy rate of the spacers 25 increases, the bonding force between the prism sheet 23 and the micro lens sheet 24 increases. However, the occupancy rate of the air layer 25AR decreases and thus the optical performance of the micro lens portion 29 is less likely to be exerted. As the occupancy rate of the spacers 25 decreases, the occupancy rate of the air layer 25AR increases and thus the optical performance of the micro lens portion 29 is more likely to be exerted. However, the bonding force between the prism sheet 23 and the micro lens sheet 24 tends to decrease.

Specifically, as illustrated in FIGS. 7 and 9, the spacers 25 are provided to connect the base 26 of the prism sheet 23 (a portion on the second optical member side) to the micro lens portion 29 of the micro lens sheet 24 (a portion on the first optical member side). The spacers 25 are made of a material the same as the material of the micro lens portion 29 and integrally formed with the micro lens portion 29 in the same process in the production of the micro lens sheet 24. Namely, the spacers 25 are made of the ultraviolet curable resin material (an acrylic resin material such as PMMA) the same as the material of the micro lens portion 29 and thus the refractive index of the spacers 25 is the same as the refractive index of the micro lens portion 29 (e.g., about 1.59). Specifically, a transfer pattern for forming the spacers 25 are formed in the forming surface of the die that is for forming the micro lens portion 29 in the production of the micro lens sheet 24. With the die, the micro lens portion 29 and the spacers 25 can be formed in the same process. The spacers 25 formed together with the micro lens portion 29 are cured with the ultraviolet rays in the process for curing the micro lens portion 29 with the ultraviolet rays. Before collectively curing the micro lens portion 29 and the spacers 25 with the ultraviolet rays, the base 26 of the prism sheet 23 is placed over the spacers 25 that are not cured with tips of the spacers 25 in contact with the base 26. When the micro lens portion 29 and the spacers 25 are collectively cured with the ultraviolet rays, the tips of the spacers 25 adhere to (or are fixed to) the light entering-side plate surface 26a of the base 26 of the prism sheet 23. The prism sheet 23 and the micro lens sheet 24 are laminated (bonded).

As described above, the micro lens portion 29 and the spacers 25 are formed with the same die in the same process. Furthermore, the micro lens portion 29 and the spacers 25 are cured with the ultraviolet rays in the same process. Still furthermore, the prism sheet 23 and the micro lens sheet 24 are bonded together in the ultraviolet curing process. It is preferable for reducing the production cost regarding the laminated type optical sheet 22.

Figure 10:
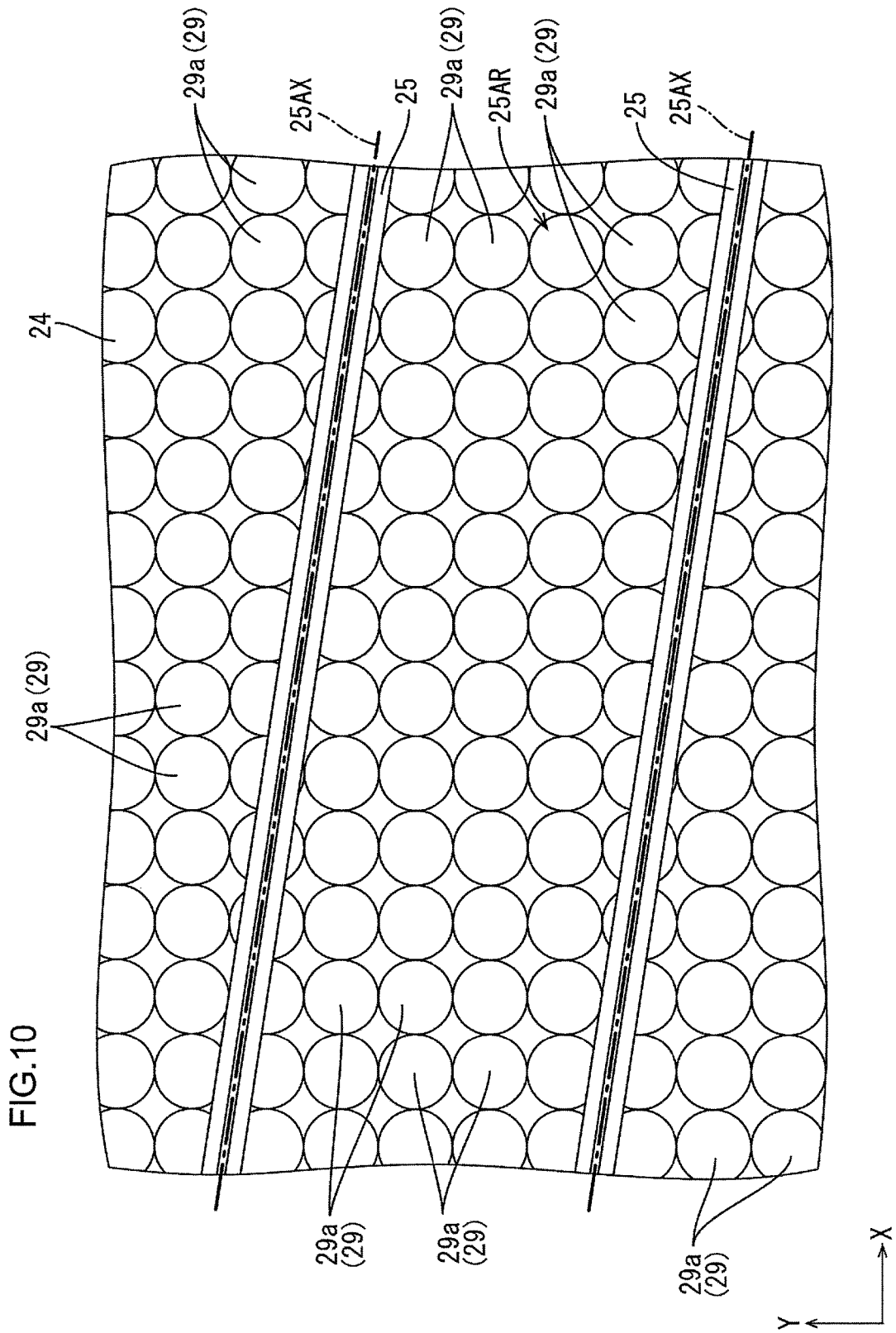
FIG. 10 is a plan view of unit micro lenses and spacers on the micro lens sheet.

As illustrated in FIG. 7, each spacer 25 has a columnar shape with a triangular cross section (a pyramid shape). As illustrated in FIGS. 9 and 10, each spacer 25 has a linear shape in the plan view. The spacer 25 extends along the plate surface of the micro lens sheet 24 and along an axis 25AX that is tilted at a predefined angle relative to the X-axis direction. An overall shape of the spacer 25 is a wall shape (a rail shape) with a predefined thickness. In FIG. 9, one axis 25AX is indicated with a chain line. As described earlier, the arrangement directions of the display pixels PX for display images correspond with the X-axis direction and the Y-axis direction in the liquid crystal panel 11. Each spacer 25 is formed in the liner shape along the plate surface of the micro lens sheet 24 and linearly extends with the axis 25AX (a liner axis) tilted at a predefined angle relative to the arrangement direction of the display pixels PX in the liquid crystal panel 11. Specifically, the axis 25AX of each spacer 25 is tilted at an angle equal to or greater than 3°, preferably, equal to or greater than 5° relative to the X-axis direction (the arrangement direction of the display pixels PX). In this embodiment, a range of the angle is from 5° to 10° (e.g., about) 8.5°. The axis 25AX of the spacer 25 is parallel to the plate surface of the base 28 of the micro lens sheet 24 and tilted at the above described angle in the clockwise direction relative to the X-axis direction (declines toward the right in FIGS. 9 and 10). Namely, an angle of tilt in this embodiment is in the acute angle range. The spacer 25 linearly extends without any breaks for an entire length of the micro lens sheet 24 in the X-axis direction. The spacer 25 has a width that gradually decreases from a base side (a micro lens portion 29 side) to a tip side (a base 26 side) in the Z-axis direction (a normal direction to the plate surface of the micro lens sheet 24) (see FIG. 7).

As illustrated in FIGS. 9 and 10, the axis 25AX that is a reference for the extension of the spacer 25 is tilted at the angle equal or greater than 3° relative to the X-axis direction (the arrangement direction of the display pixels 11PX). Therefore, the spacer 25 having the axis 25AX is less likely to interfere with display pixels 11PX (see FIG. 6). Therefore, fringe patterns that are also referred to as the Moire fringes are less likely to occur. If the tilting angle of the axis 25AX of the spacer 25 relative to the X-axis direction is smaller than 3°, a sufficient level of the interference reduction effect may not be achieved. The spacer 25 linearly extends for the entire length of the micro lens sheet 24 in the X-axis direction. The transfer pattern in the forming surface of the die, which is for forming the micro lens portion 29 and the spacers 25, includes substantially linear grooves, that is, the transfer pattern is simple. In a production of the die, the transfer pattern for forming the spacers 25 can be easily formed in the forming surface of the die. This is preferable for reducing the production cost of the die and the production cost of the laminated type optical sheet 22. Furthermore, the heights of the spacers 25 can be easily equalized. This is preferable for equalizing the distances between the prism sheet 23 and the micro lens sheet 24 within the plate surfaces thereof. Furthermore, the spacers 25 exert a larger bonding force between the prism sheet 23 and the micro lens sheet 24.

As illustrated in FIGS. 9 and 10, the spacers 25 are arranged at intervals in the Y-axis direction (a direction that crosses the axis 25AX) perpendicular to the X-axis direction. A distance between the spacers 25 that are adjacent to each other in the Y-axis direction (an interval of the spacers 25) is larger than a distance between the unit micro lenses 29a that are adjacent to each other in the Y-axis direction (an interval of the unit micro lenses 29a). More specifically, the spacers 25 are arranged such that multiple unit micro lenses 29a are sandwiched between the spacers 25 that are adjacent to each other in the Y-axis direction. It is preferable to set the distance between the spacers 25 that are adjacent to each other in the Y-axis direction is in a range from 250 μm to 270 μm, which is about five times larger than the distance between the unit micro lenses 29a that are adjacent to each other in the Y-axis direction, or larger. Therefore, at least four unit micro lenses 29a are sandwiched between the spacers 25 that are adjacent to each other in the Y-axis direction.

According to the configuration, as illustrated in FIGS. 7 and 9, the unit micro lenses 29a facing the air layer 25AR are disposed between the spacers that are arranged at intervals in the Y-axis direction. Therefore, a difference in refraction index between the unit micro lenses 29a and the air layer 25AR is maintained. Because the unit micro lenses 29a that are sandwiched between the spacers 25 that are adjacent to each other in the Y-axis direction face the air layer 25AR, the entire areas of the hemisphere surfaces 29a1 of the unit micro lenses 29a face the air layer 25AR. Therefore, the difference in refraction index between the unit micro lenses 29a and the air layer 25AR is maintained. According to the configuration, the isotropic light collecting function, which is the optical performance of the micro lens portion 29, can be exerted at a sufficient level. Therefore, the light exiting from the laminated type optical sheet 22 can have a sufficient level of brightness.

The laminated type optical sheet 22 in this embodiment has the configuration described above. Next, a method of producing the laminated type optical sheet 22 will be described. The method includes at least a prism sheet producing process, a micro lens sheet producing process, and a bonding process. The prism sheet producing process is for producing the prism sheet 23. The micro lens sheet producing process is for producing the micro lens sheet 24. The bonding process is for bonding the prism sheet 23 and the micro lens sheet 24 together. The prism sheet producing process includes at least a base producing step (a first base producing step), a prism forming step (a first lens forming step), and prism curing step (a first lens curing step). The base producing step is for producing the base 26. The prism forming step is for forming the prism portion 27 on the light exiting-side plate surface 26b of the base 26. The prism curing step is for curing the prism portion 27 with the ultraviolet rays.

The micro lens sheet producing process includes at least a base producing step (a second base producing step), a micro lens and spacer forming step (a second lens and spacer forming step), a prism sheet placing step (a first optical member placing step), and a micro lens and spacer curing step (a second lens and spacer curing step). The base producing step is for producing the base 28. The micro lens and spacer forming step is for forming the micro lens portion 29 and the spacers 25 on the light exiting-side plate surface 28b of the base 28. The prism sheet placing step is for placing the prism sheet 23 such that the spacers 25 that are not cured are in contact with the prism sheet 23. The micro lens and spacer curing step is for curing the micro lens portion 29 and the spacers 25 with the ultraviolet rays. The micro lens and spacer curing step also performs the bonding process. Namely, the bonding process is integrated into the micro lens sheet producing process.

Next, the micro lens sheet producing process will be described in detail. First, the base 28 is produced through the base producing step. In the micro lens and spacer forming step performed next, the forming die that is produced in advance is filled with the ultraviolet curable resin material that is not cured. The forming surface of the die is transferred onto the ultraviolet curable resin material that is not cured. The base 28 is placed on the opening edge of the die in such a condition. The ultraviolet curable resin material that is not cured and onto which the forming surface of the die is transferred is placed on the light exiting-side plate surface 28b. Then, the die is removed and the prism sheet placing step is performed. In the prism sheet placing step, the prism sheet 23 is placed such that tips of portions of the ultraviolet curable resin material that is not cured and onto which the forming surface of the die is transferred corresponding to the spacers 25 are in contact with the light entering plate surface 26a of the base 26 of the prism sheet 23 produced in advance. The micro lens and spacer curing step (the bonding step) is performed in this condition. In the micro lens and spacer curing step, the ultraviolet rays are applied to the ultraviolet curable resin material that is not cured and the ultraviolet curable resin material is cured. As a result, the micro lens portion 29 and the spacers 25 are collectively formed. The micro lens portion 29 is tightly fixed to the light exiting-side plate surface 28b of the base 28 and the tips of the spacers 25 are tightly fixed to the light entering-side plate surface 26a of the base 26 of the prism sheet 23. The micro lens portion 29 and the spacers 25 are collectively formed and the prism sheet 23 and the micro lens sheet 24 are laid on top of each other and bonded. The air layer 25AR is provided with the spacers 25 between the prism sheet 23 and the micro lens sheet 24 that are bonded together. The hemisphere surfaces 29a1 of the unit micro lenses 29a that are sandwiched between the spacers 25 that are adjacent to each other in the Y-axis direction are arranged to face the air layer 25AR.

When the liquid crystal display device 10 including the laminated type optical sheet 22 that is produced as described above is turned on, various kinds of signals related to image display are transmitted from the control circuit board that is not illustrated to the liquid crystal panel 11. With the signals, the driving of the liquid crystal panel 11 is controlled. Furthermore, the driving of the LEDs 17 on the LED boards 18 is controlled by the LED driver circuit board that is not illustrated. As illustrated in FIGS. 4 and 5, the light rays from the LEDs 17 that are turned on are diffused in the wide angle range by the diffuser lenses 19 and applied to the optical members 15 (the diffuser plate 21 and the laminated type optical sheet 22). The light rays on which the predefined optical effects are exerted by the optical members 15 are applied to the liquid crystal panel 11 and used for image display based on the display pixels 11PX in the liquid crystal panel 11 (see FIG. 6).

Next, the optical effects of the optical members 15 will be described in detail. When the light rays from the diffuser lenses 19 are applied to the diffuser plate 21, the diffuser particles in the diffuser plate 21 exert the diffusing effects on the light rays. The light rays exiting from the diffuser plate 21 pass through the air layer on the front side (the air layer between the diffuser plate 21 and the laminated type optical sheet 22 provided by the frame 16). Then, the light rays are applied to the micro lens sheet 24 of the laminated type optical sheet 22. The light rays enter the base 28 of the micro lens sheet 24 through the light entering-side plate surface 28a, pass through the base 28, and exit through the light exiting-side plate surface 28b. The light rays then enter the unit micro lenses 29a of the micro lens portion 29. The light rays pass through the unit micro lenses 29a and exit through the hemisphere surfaces 29a1. When exiting through the hemisphere surfaces 29a1, the light rays are refracted at the interface between the air layer 25AR (the air layer 25AR between the micro lens sheet 24 and the prism sheet 23) with angles corresponding to the incidences and the refractive index of the micro lens portion 29. The light rays exiting the unit micro lenses 29a through the hemisphere surfaces 29a1 are controlled such that the travel directions of the light rays relative to the X-axis direction and the Y-axis direction that correspond with the arrangement directions of the unit micro lenses 29a are closer to the frontward direction. Namely, the light collecting effects are exerted in an isotropic manner on the light rays passing through the micro lens sheet 24 with respect to the X-axis direction and the Y-axis direction.

The interval of the spacers 25 that holds the air layer 25AR between the micro lens sheet 24 and the prism sheet 23 in the Y-axis direction is larger than the interval between the unit micro lenses 29a in the Y-axis direction. The unit micro lenses 29a are sandwiched between the spacers 25 that are adjacent to each other. The sufficient number of the unit micro lenses 29a having the hemisphere surfaces 29a1, the entire areas of which face the air layer 25AR, are provided. According to the configuration, the isotropic light collecting function, which is the optical performance of the micro lens portion 29, is exerted at a sufficient level. Therefore, the light exiting from the laminated type optical sheet 22 has sufficiently high brightness.

The light rays on which the isotropic light collecting effects are exerted while passing through the micro lens sheet 24 are applied to the prism sheet 23 via the air layer 25AR. The light rays enter the base 26 of the prism sheet 23 though the light entering-side plate surface 26a, passing through the base 26, and exit through the light exiting-side plate surface 26b. Then, the light rays enter the unit prisms 27a of the prism portion 27. The light rays pass through the unit prisms 27a and exit through the sloped surfaces 27a1. When exiting through the sloped surfaces 27a1, the light rays are refracted at the interface between the sloped surfaces 27a1 and the air layer (the air layer between the prism sheet 23 and the liquid crystal panel 11) with angles corresponding to the incidences and the refractive index of the prism portion 27. The light rays exiting the unit prisms 27a through the sloped surfaces 27a1 are controlled such that the travel directions of the light rays relative to the Y-axis direction that corresponds with the arrangement direction of the unit prisms 27a are closer to the frontward direction. Namely, the light collecting effects are selectively exerted on the light rays passing through the prism sheet 23 with respect to the Y-axis direction. The light collecting effects are exerted on the light rays exiting from the laminated type optical sheet 22 by the prism sheet 23 and the micro lens sheet 24.

When the light rays on which the light collecting effects are exerted and exiting from the laminated type optical sheet 22 are applied to the liquid crystal panel 11, whether the light is passed and the amount of passing light are controlled for each color pixel in each display pixel 11PX by the corresponding TFT 17 that is driven based on the various kinds of signals. The display color and the brightness of each display pixel PX are controlled and thus a specific image is displayed on the display surface of the liquid crystal panel 11. The prism sheet 23 and the micro lens sheet 24 in the laminated type optical sheet 22 include the prism portion 27 and the micro lens portion 29. The interval between the unit prisms 27a and the interval between the unit micro lenses 29a are about equal to the interval between the same color pixels in the display pixels 11PX. Therefore, the interference fringes that are also referred to as the Moire fringes are less likely to occur. Regarding the spacers 25 in the laminated type optical sheet 22, the interval in the Y-axis direction is larger than the interval between the unit micro lenses 29a or the interval between the same color pixels in the display pixels 11PX to maintain the air layer 25AR with the predefined occupancy rate between the prism sheet 23 and the micro lens sheet 24 so that the unit micro lenses 29a can exert the sufficient level of the optical performance. Therefore, the Moire fringes may occur. However, the spacers are arranged with the axes 25AX that are the references for extension thereof tilted at equal to or greater than 3° relative to the X-axis direction that corresponds with the arrangement direction of the color pixels in the display pixels 11PX. Therefore, the spacers 25 having the axes 25AX are less likely to interfere with the display pixels 11PX and thus the Moire fringes are less likely to occur. According to this embodiment, the spacers 25 are arranged to maintain the air layer 25AR with the sufficient occupancy rate between the prism sheet 23 and the micro lens sheet 24 so that the micro lens portion 29 can sufficiently exert the isotropic light collecting function while reducing the Moire fringes to provide high display quality for the images displayed on the liquid crystal panel 11.

As described above, the laminated type optical sheet 22 in this embodiment (the laminated type optical member) is the laminated type optical sheet 22 (the laminated type optical member) used in the liquid crystal display device 10 (the display device) configured to display images based on the display pixels 11PX (the pixels) arranged in a matrix. The laminated type optical sheet 22 includes the prism sheet 23 (the first optical member), the micro lens sheet 24 (the second optical member), and the spacers 25. The micro lens sheet 24 is disposed on the light entering side relative to the prism sheet 23 to overlap the prism sheet 23 with the gap between the micro lens sheet 24 and the prism sheet 23. The spacers 25 are disposed between the prism sheet 23 and the micro lens sheet 24 to maintain the space between the prism sheet 23 and the micro lens sheet 24 to form the air layer 25AR. The spacers 25 have the axes 25AX along the plate surface of the micro lens sheet 24. The spacers 25 are arranged with the axes 25AX tilted at equal to or greater than 3° relative to the arrangement direction of the display pixels 11PX.

Because the air layer 25AR is provided between the prism sheet 23 and the micro lens sheet 24 with the spacers 25, the difference in refractive index between the micro lens sheet 24 and the air layer 25AR is maintained. Therefore, the micro lens sheet 24 can properly exert the optical performance. The spacers 25 have the axes 25AX along the plate surface of the micro lens sheet 24. This configuration is advantageous in the production of producing the laminated type optical sheet 22 including forming the spacers 25 between the prism sheet 23 and the micro lens sheet 24. The spacers 25 are arranged such that the axes 25AX are tilted at the angle equal to or greater than 3° relative to the arrangement direction of the display pixels 11PX. Therefore, the spacers 25 having the axes 25AX are less likely to interfere with the display pixels 11PX and thus the interference fringes that are also referred to as the Moire fringes are less likely to occur. If the tilting angle of the axes 25AX of the spacers 25 relative to the arrangement direction of the display pixels 11PX is smaller than 3°, the sufficient level of the interference reduction effect may not be achieved. The "axes" include the axis 25AX of a single spacer 25 and the axis 25AX of multiple spacers 25.

Each spacer 25 has the linear shape extending along the axis 25AX. According to the configuration, if the spacers 25 are formed using a die, the die can be easily produced. Therefore, the laminated type optical sheet 22 can be also easily produced. Furthermore, the heights of the spacers 25 can be easily equalized. This is preferable for equalizing the distances between the prism sheet 23 and the micro lens sheet 24 within the plate surfaces thereof. Furthermore, the spacers 25 exert larger bonding force between the prism sheet 23 and the micro lens sheet 24.

The spacer 25 extends for the entire length of the micro lens sheet 24. Therefore, the laminated type optical sheet 22 can be easily produced and the heights of the spacers 25 can be easily equalized. Furthermore, the spacers 25 exert larger bonding force between the prism sheet 23 and the micro lens sheet 24.

The micro lens sheet 24 includes at least the base 28 having the sheet shape and the micro lens portion 29 (the lens portion). The micro lens portion 29 includes the unit micro lenses 29a (the unit lenses) formed on the plate surface of the base 28 on the prism sheet 23 side and arranged along the direction that crosses at least the axes 25AX. The spacers 25 are arranged at intervals in the direction that crosses the axes 25AX. The interval is larger than the interval between the unit micro lenses 29a in the direction that crosses the axes 25AX. According to the configuration, the unit micro lenses 29a facing the air layer 25AR are arranged between the spacers 25 that are arranged at intervals in the direction that crosses the axes 25AX. Therefore, the difference in refractive index between the unit micro lenses 29a and the air layer 25AR is maintained. According to the configuration, the micro lens portion 29 can properly exert the optical performance.

The spacers 25 that are adjacent to each other in the direction that crosses the axes 25AX sandwich the unit micro lenses 29a. According to the configuration, the unit micro lenses 29a sandwiched between the spacers 25 that are arranged at intervals in the direction that crosses the axes 25AX face the air layer 25AR. Therefore, the difference in refractive index between the unit micro lenses 29a and the air layer 25AR is maintained. According to the configuration, the micro lens portion 29 can properly exert the optical performance.

The spacers 25 are made of a material the same as the material of that of at least the portion of the micro lens sheet 24 on the prism sheet 23 side. According to the configuration, the spacers 25 can be formed together with at least the portion of the micro lens sheet 24 on the prism sheet 23. This configuration is preferable for reducing the production cost.

The micro lens sheet 24 includes the base 28 having the sheet shape and the micro lens portion 29 on the plate surface of the base 28 on the prism sheet 23 side. The spacers 25 are made of a material the same as the material of that of the micro lens portion 29. According to the configuration, the spacers 25 can be formed in the step of forming the micro lens portion 29 on the base 28. This configuration is preferable for reducing the production cost.

The spacers 25 and at least the portion of the micro lens sheet 24 on the prism sheet 23 side are made of the ultraviolet curable resin material. According to the configuration, the spacers 25 can be formed together with at least the portion of the micro lens sheet 24 on the prism sheet 23 side using the die and cured with the ultraviolet rays.

The backlight unit 12 (the lighting device) in this embodiment includes the laminated type optical sheet 22 that is described above and the LEDs 17 (the light sources) configured to apply the light rays to the laminated type optical sheet 22. In the backlight unit 12 having such a configuration, the laminated type optical sheet 22 can properly exert the optical performance. Therefore, the backlight unit 12 can emit proper light.

The liquid crystal display device 10 in this embodiment includes the backlight unit 12 that is described above and the liquid crystal panel 11 (the display panel). The liquid crystal panel 11 includes the display pixels 11PX configured to display images using the light applied thereto by the backlight unit 12. In the liquid crystal display device 10 having such a configuration, the backlight unit 12 emits proper light. Therefore, the liquid crystal display device 10 can display images with high display quality.

The television device 10TV according to this embodiment include the liquid crystal display device 10 described above. In the television device 10TV, the liquid crystal display device 10 provides the high display quality. Therefore, the television device 10TV can display television images with high display quality.

Second Embodiment

Figure 13:
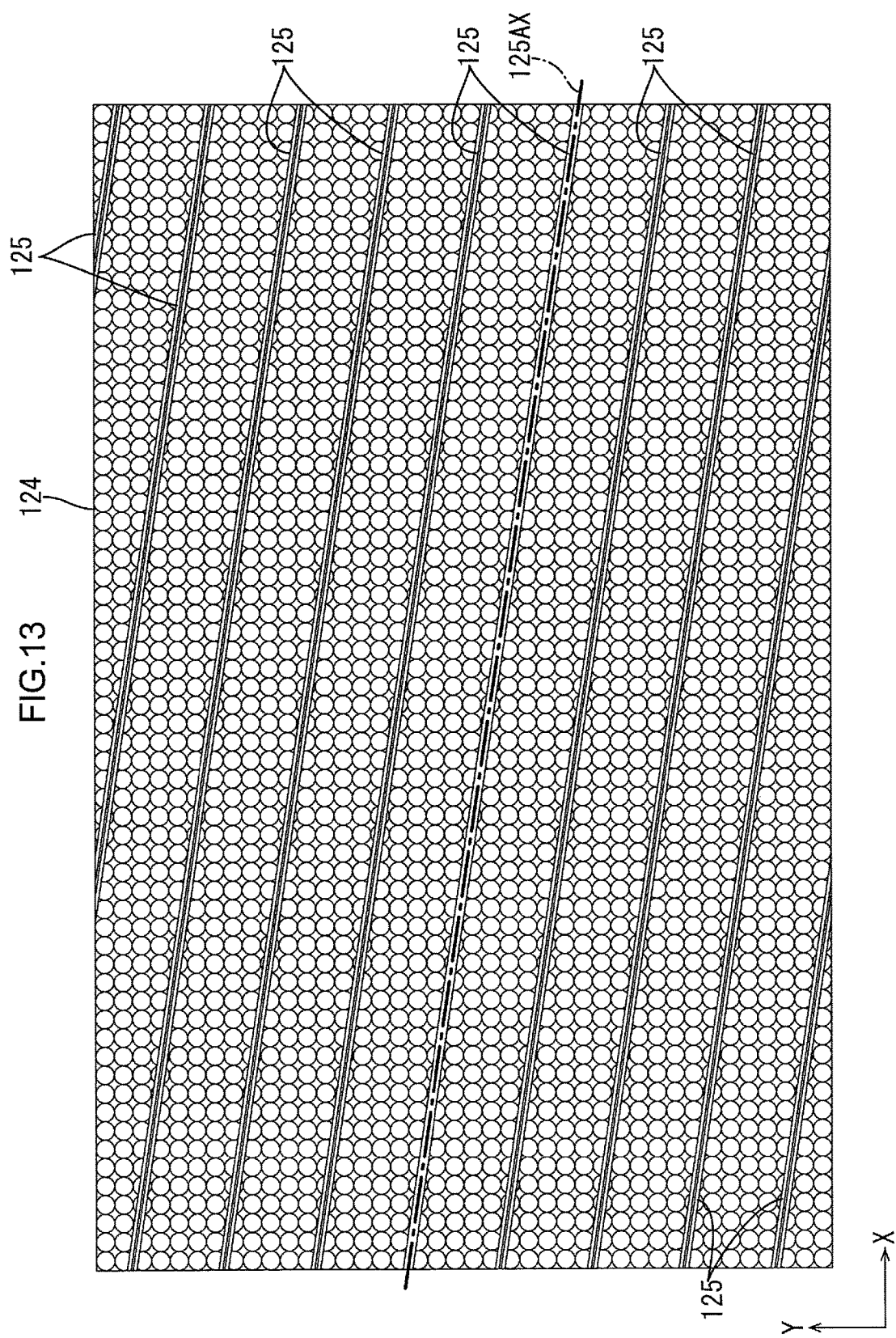
FIG. 13 is a plan view of a micro lens sheet included in the laminated type optical sheet.

A second embodiment of the present invention will be described with reference to FIGS. 11 to 13. The second embodiment includes a laminated type optical sheet 122 having a configuration different from that of the first embodiment. Configurations, functions, and effects similar to those of the first embodiment will not be described.

Figure 11:
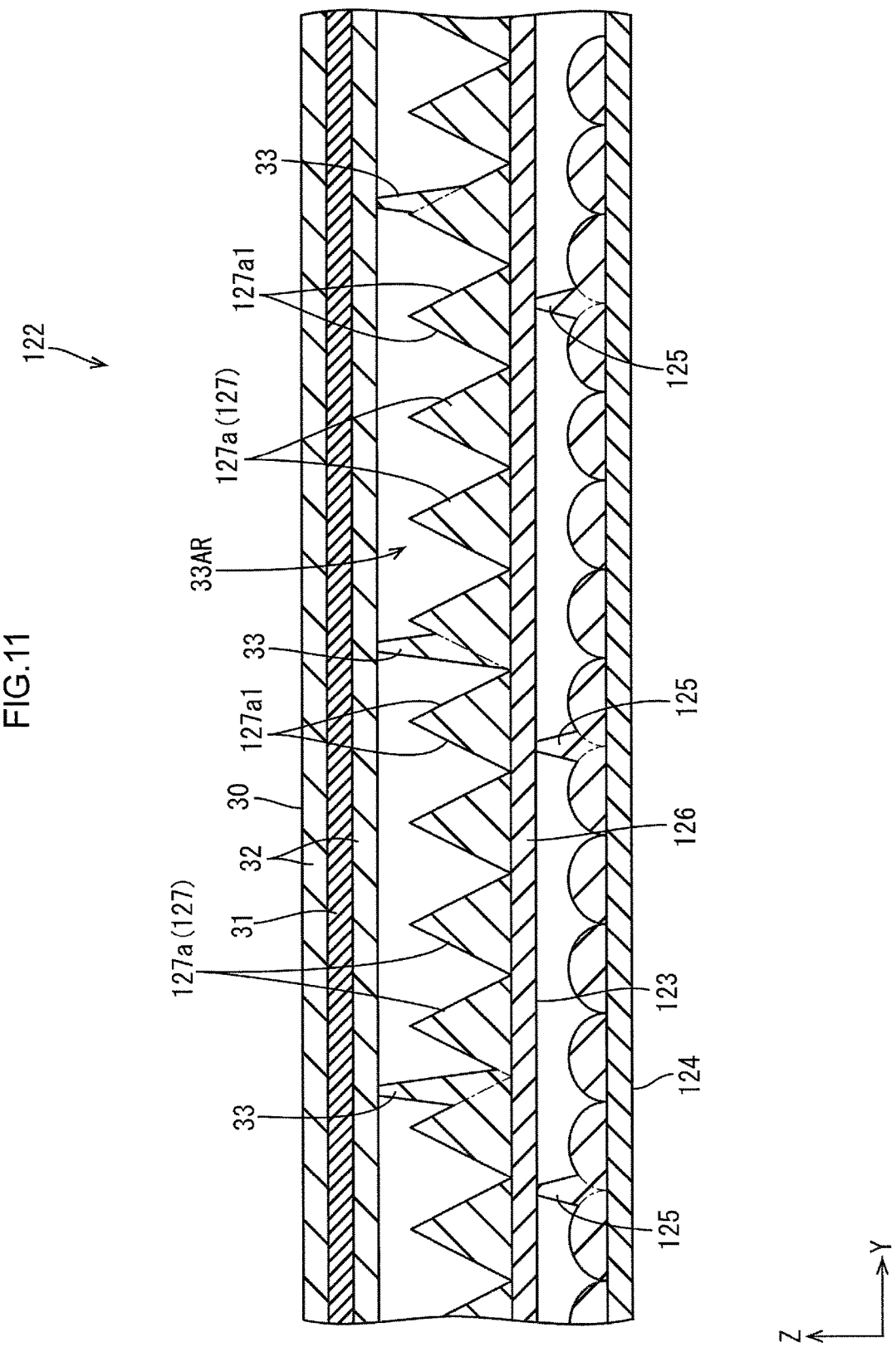
FIG. 11 is a cross sectional view illustrating a cross sectional configuration of a laminated type optical sheet along a short dimension thereof according to a second embodiment of the present invention.

As illustrated in FIG. 11, the laminated type optical sheet 122 in this embodiment includes a prism sheet 123 and a reflective type polarizing sheet 30 (a third optical member)

which is laid on a front side relative to the prism sheet 123. The laminated type optical sheet 122 has a three-layer structure as a whole. The reflective type polarizing sheet 30 includes a reflective type polarizing film 31 and a pair of diffuser films 32 that sandwich the reflective type polarizing film 31 from the front and the rear. The reflective type polarizing film 31 has a multi-layer structure including layers having different refractive indexes and being alternately laid on top of each other. The reflective type polarizing film 31 is configured to pass p waves in light from the prism sheet 123 and to reflect s waves to the rear side. The s waves reflected by the reflective type polarizing film 31 may be reflected by a reflection sheet to the front side and split into s waves and p waves. With the reflective type polarizing film 31, the s waves, which may be absorbed by a polarizing plate in a liquid crystal panel, can be reusable by reflecting them to the rear side (the backlight unit side) and thus light use efficiency (or intensity) can be increased. The diffuser films 32 are made of synthetic resin material such as polycarbonate. Embossing is performed on plate surfaces of the diffuser films 32 on sides opposite from the reflective type polarizing film 31 to exert diffusing effects on the light.

As illustrated in FIG. 11, the reflective type polarizing sheet 30 is disposed on the front side relative to the prism sheet 123 to overlap the prism sheet 123 with a gap between the reflective type polarizing sheet 30 and the prism sheet 123. Between the reflective type polarizing sheet 30 and the prism sheet 123, second spacers 33 are disposed to hold the gap between the reflective type polarizing sheet 30 and the prism sheet 123 to form a second air layer 33AR. The second spacers 33 mainly have a function for holding (maintaining) the second air layer 33AR between the reflective type polarizing sheet 30 and the prism sheet 123 and a function for bonding the reflective type polarizing sheet 30 and the prism sheet 123 to combine them together. The second spacers 33 are disposed within the plate surfaces of the reflective type polarizing sheet 30 and the prism sheet 123 with a predefined occupancy rate (a rate of an area of the second spacers in a plan view per a total area of the plate surface of the reflective type polarizing sheet 30 or the prism sheet 123). The reciprocal of the occupancy rate is about equal to an occupancy rate of the second air layer 33AR (a rate of an area of the second air layer 33AR in the plan view per the total area of the plate surface of the reflective type polarizing sheet 30 or the prism sheet 123). As the occupancy rate of the second spacers 33 increases, a bonding force between the reflective type polarizing sheet 30 and the prism sheet 123 increases. However, the occupancy rate of the second air layer 33AR decreases and a prism portion 127 is less likely to exert optical performance. As the occupancy rate of the second spacers 33 decreases, the occupancy rate of the second air layer 33AR increases and the prism portion 127 is more likely to exert the optical performance. However, the bonding force between the reflective type polarizing sheet 30 and the prism sheet 123 decreases.

Specifically, as illustrated in FIG. 11, the second spacers 33 are provided to connect the diffuser film 32 of the reflective type polarizing sheet 30 on the rear side (a portion on a first optical member side) to the prism portion 127 of the prism sheet 123 (a portion on a third optical member side). The second spacers 33 are made of a material the same as the material of the prism portion 127 and formed integrally with the prism portion 127 in the same step of production of the prism sheet 123. Namely, the second spacers 33 are made of the ultraviolet curable resin material (the acrylic resin material such as PMMA) which is the material of the prism portion 127. Each second spacer 33 has a refractive index the same as that of the prism portion 127 (e.g., about 1.59). Specifically, a transfer pattern for forming the second spacers 33 is formed in a forming surface of a forming die for forming the prism portion 127 used in the production of the prism sheet 123. Therefore, the second spacers 33 can be formed together with the prism portion 127 in the same step. The second spacers 33 formed together with the prism portion 127 are cured with the ultraviolet rays applied thereto in a step of curing the prism portion 127. Before collectively curing the prism portion 127 and the second spacers 33 with the ultraviolet rays, the diffuser film 32 on the rear side in the reflective type polarizing sheet 30 is placed such that tips of the second spacers 33 before cured are in contact with the diffuser film 32. When the prism portion 127 and the second spacers 33 are collectively cured with the ultraviolet rays, the tips of the second spacers 33 are bonded (fixed) to the rear plate surface (a light entering-side plate surface) of the diffuser film 32 on the rear side in the reflective type polarizing sheet 30. As a result, the reflective type polarizing sheet 30 and the prism sheet 123 are layered and held (bonded) together. As described above, the prism portion 127 and the second spacers 33 are formed using the same forming die in the same step and the prism portion 127 and the second spacers 33 are cured with the ultraviolet rays in the same step. Furthermore, the reflective type polarizing sheet 30 and the prism sheet 123 are bonded together in the ultraviolet curing step. This configuration is preferable for reducing the production cost of the laminated type optical sheet 122.

As illustrated in FIG. 11, each second spacer 33 columnar shape with a triangular cross section (a pyramid shape). As illustrated in FIG. 12, each second spacer 33 has a linear shape in the plan view. The second spacer 33 extends along the plate surface of the prism sheet 123 and along a second axis 33AX that is tilted at a predefined angle relative to the X-axis direction. An overall shape of the second spacer 33 is a wall shape (a rail shape) with a predefined thickness. In FIG. 12, one second axis 33AX is indicated with a chain line. As described earlier, the arrangement directions of the display pixels PX for display images correspond with the X-axis direction and the Y-axis direction in the liquid crystal panel. Each second spacer 33 linearly extends with the second axis 33AX tilted at a predefined angle relative to the arrangement direction of the display pixels PX in the liquid crystal panel (see FIG. 6). Specifically, the second axis 33AX of each second spacer 33 is tilted at an angle equal to or greater than 3°, preferably, equal to or greater than 5° relative to the X-axis direction (the arrangement direction of the display pixels). In this embodiment, a range of the angle is from 5° to 10° (e.g., about 8.5°). The second axis 33AX of the second spacer 33 is parallel to the plate surface of a base 126 of the prism sheet 123 and tilted at the above described angle in the counterclockwise direction relative to the X-axis direction (inclines toward the right in FIG. 12) in the plan view. Namely, as illustrated in FIGS. 12 and 13, the second axis 33AX of the second spacer 33 is tilted toward an opposite side from a side to which an axis 125AX (a first axis) of each spacer 125 (a first spacer) in a micro lens sheet 124 with respect to the X-axis direction. The second spacer 33 is oriented such that an angle of the second axis 33AX relative to the X-axis direction is about equal to an angle of the axis 125AX of each spacer 125 relative to the X-axis direction. The angle of the second axis 33AX of the second spacer 33 relative to the axis 125AX of the spacer 125 is about twice of the angle of the second axis 33AX relative to the X-axis direction. The second spacer 33 linearly extends without any breaks for an entire length of the prism sheet 123 in the X-axis direction. The second spacer 33 has a width that gradually decreases from a base side (a prism portion 127 side) to a tip side (a rear diffuser film 32 side) in the Z-axis direction (a normal direction to the plate surface of the prism sheet 123) (see FIG. 11).

As illustrated in FIG. 12, the second axis 33AX that is a reference for the extension of the second spacer 33 is tilted at the angle equal or greater than 3° relative to the X-axis direction (the arrangement direction of the display pixels). Therefore, the second spacer 33 having the second axis 33AX is less likely to interfere with display pixels (see FIG. 6). Therefore, fringe patterns that are also referred to as the Moire fringes are less likely to occur. As illustrated in FIGS. 12 and 13, the second spacers 33 are oriented such that the second axis 33AX of each second spacer 33 is tilted at an angle equal to or greater than 3° relative to the axis 125AX of each spacer 125. Therefore, the spacers 125 are less likely to interfere with the second spacers 33. The fringe patterns that are also referred to as the Moire fringes are further properly reduced. If the tilting angle the second axis 33AX of the second spacer 33 relative to the X-axis direction or the axis 125AX of the spacer 125 is smaller than 3°, a sufficient level of the interference reduction effect may not be achieved. The second spacer 33 linearly extends for the entire length of the prism sheet 123 in the X-axis direction. The transfer pattern in the forming surface of the die, which is for forming the prism portion 127 and the second spacers 33, includes substantially linear grooves, that is, the transfer pattern is simple. In a production of the die, the transfer pattern for forming the second spacers 33 can be easily formed in the forming surface of the die. This is preferable for reducing the production cost of the die and the production cost of the laminated type optical sheet 122. Furthermore, the heights of the second spacers 33 can be easily equalized. This is preferable for equalizing the distances between the reflective type polarizing sheet 30 and the prism sheet 123 within the plate surfaces thereof. Furthermore, the second spacers 33 exert a larger bonding force between the reflective type polarizing sheet 30 and the prism sheet 123.

As illustrated in FIG. 12, the second spacers 33 are arranged at intervals in the Y-axis direction (a direction that crosses the second axis 33AX) perpendicular to the X-axis direction. A distance between the second spacers 33 that are adjacent to each other in the Y-axis direction (an interval of the second spacers 33) is larger than a distance between unit prisms 127a that are adjacent to each other in the Y-axis direction (an interval of the unit prisms 127a). More specifically, the second spacers 33 are arranged such that multiple unit prisms 127a are sandwiched between the second spacers 33 that are adjacent to each other in the Y-axis direction. It is preferable to set the distance between the second spacers 33 that are adjacent to each other in the Y-axis direction is in a range from 250 μm to 270 μm, which is about five times larger than the distance between the unit prisms 127a that are adjacent to each other in the Y-axis direction, or larger. Therefore, at least four unit prisms 127a are sandwiched between the second spacers 33 that are adjacent to each other in the Y-axis direction.

According to the configuration, as illustrated in FIGS. 11 and 12, the unit prisms 127a facing the second air layer 33AR are disposed between the second spacers 33 that are arranged at intervals in the Y-axis direction. Therefore, a difference in refractive index between the unit prisms 127a and the second air layer 33AR is maintained. Furthermore, the unit prisms 127a sandwiched between the second spacers 33 that are adjacent to each other in the Y-axis direction face the second air layer 33AR. Therefore, entire areas of sloped surfaces 127a1 of the unit prisms 127a face the second air layer 33AR and thus the difference in the refractive index between the unit prisms 127a and the second air layer 33AR is maintained. According to the configuration, the prism portion 127 can sufficiently perform the isotropic light collecting function that is the optical performance thereof. Therefore, the light exiting from the laminated type optical sheet 122 has sufficiently high intensity.

As described above, this embodiment includes the reflective type polarizing sheet 30 (the third optical member) and the second spacers 33. The reflective type polarizing sheet 30 is disposed on the opposite side from the micro lens sheet 124 side relative to the prism sheet 123 with a gap between the reflective type polarizing sheet 30 and the prism sheet 123 to overlap the prism sheet 123. The second spacers 33 are disposed between the prism sheet 123 and the reflective type polarizing sheet 30 to hold the gap between the second spacers 33 are disposed between the prism sheet 123 and the reflective type polarizing sheet 30 and to from the second air layer 33AR between the second spacers 33 are disposed between the prism sheet 123 and the reflective type polarizing sheet 30. Each second spacer 33 has the second axis 33AX that is along the plate surface of the prism sheet 123. Each second spacer 33 is oriented such that the second axis 33AX thereof is tilted at the angle equal to or greater than 3° relative to the arrangement direction of the display pixels and tilted at the angle equal to or greater than 3° relative to the axis 125AX of each spacer 125. With the second air layer 33AR formed between the prism sheet 123 and the reflective type polarizing sheet 30 with the second spacers 33, the difference in the refractive index between the prism sheet 123 and the second air layer 33AR is maintained. Therefore, the prism sheet 123 can properly exert the optical performance. The second spacers 33 have the second axes 33AX along the plate surface of the prism sheet 123. This configuration is advantageous in the production of producing the laminated type optical sheet 122 including forming the second spacers 33 between the prism sheet 123 and the reflective type polarizing sheet 30. The second spacers 33 are arranged such that the second axes 33AX are tilted at the angle equal to or greater than 3° relative to the arrangement direction of the display pixels. Therefore, the second spacers 33 are less likely to interfere with the display pixels and with the spacers 125. According to the configuration, the interference fringes that are also referred to as the Moire fringes can be further properly reduced. If the tilting angle of the second axes 33AX of the second spacers 33 relative to the arrangement direction of the display pixels 11PX is smaller than 3°, the sufficient level of the interference reduction effect may not be achieved.

Third Embodiment

A third embodiment of the present invention will be described with reference to FIG. 14 or 15. The third embodiment includes spacers 225 that have configurations different from those of the first embodiment. Configurations, functions, and effects similar to those of the first embodiment will not be described.

Figure 14:
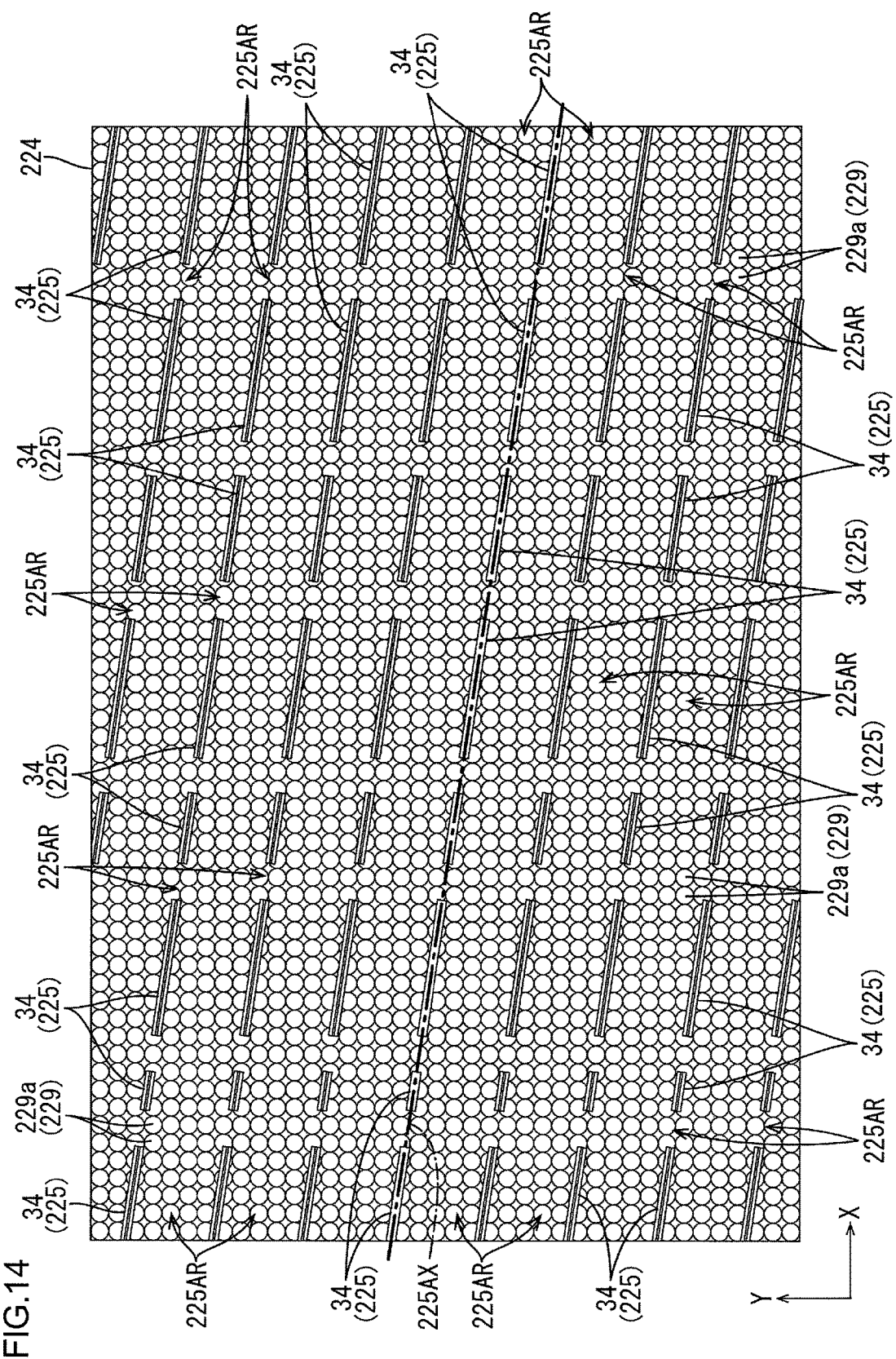
FIG. 14 is a plan view of a micro lens sheet included in a laminated type optical sheet according to a third embodiment of the present invention.
Figure 15:
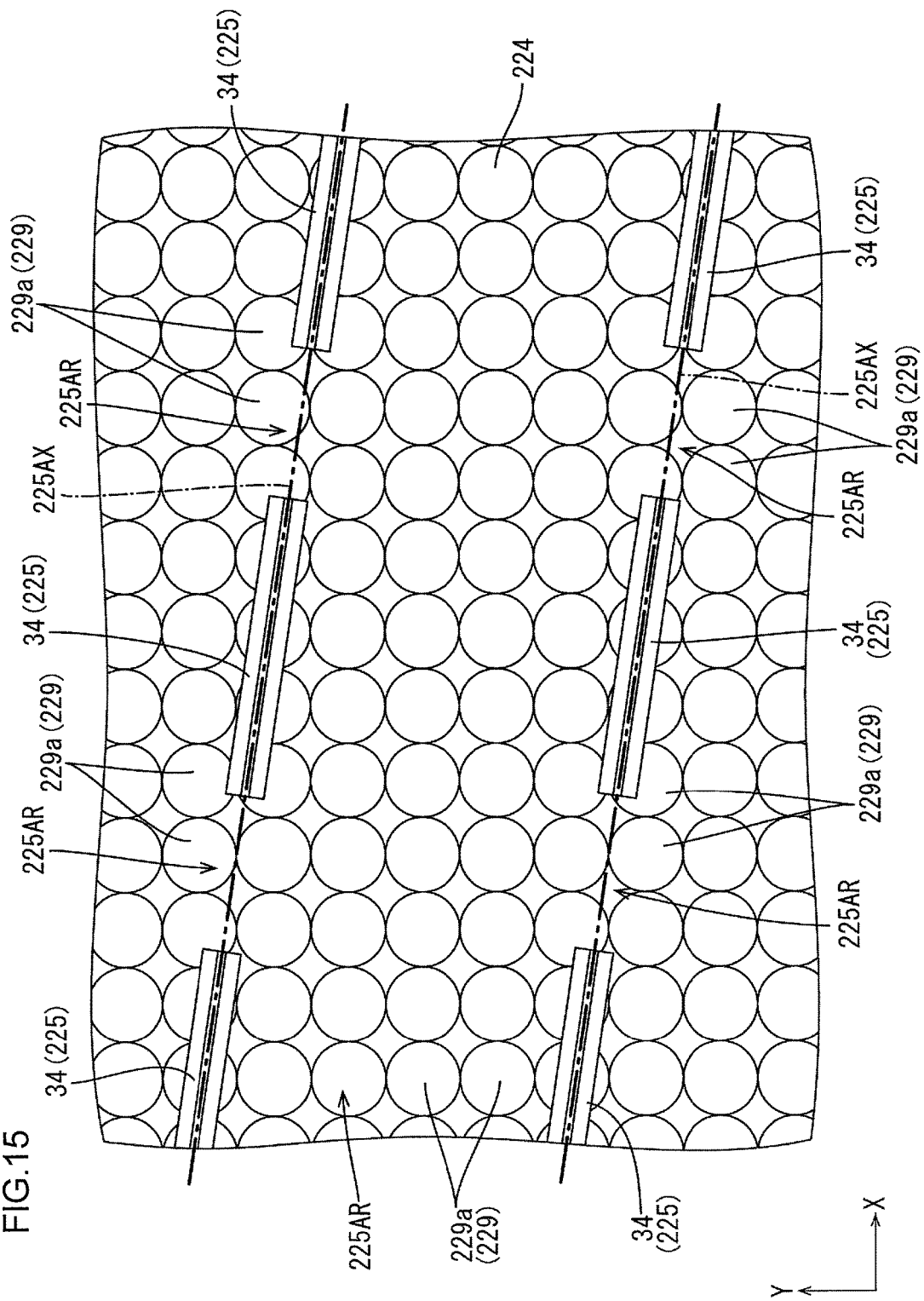
FIG. 15 is a plan view of unit micro lenses and spacers on the micro lens sheet.

As illustrated in FIGS. 14 and 15, spacers 225 in this embodiment linearly extend with breaks within a plate surface of a micro lens sheet 224. Namely, multiple linear unit spacers 34 that extend along an axis 225AX are arranged at intervals along the axis 225AX. Each linear unit spacer 34 has a length smaller than a dimension of the micro lens sheet 224 measuring in the X-axis direction (a long dimension). The linear unit spacers 34 arranged at intervals along the same axis 225AX may have lengths different from each other. The linear unit spacers 34 that are adjacent to each other in the Y-axis direction have lengths substantially equal to each other. A distance between the liner unit spacers 34 that are adjacent to each other in a direction along the axis 225AX is smaller than the minimum length of the liner unit spacers 34 but larger than an interval of unit micro lenses 229a. According to the configuration, an air layer 225AE exists not only between the linear spacers 34 that are adjacent to each other in the Y-axis direction but also between the linear unit spacers 34 that are adjacent to each other in the direction along the axis 225AX. Therefore, a micro lens portion 229 can exert higher isotropic light collecting performance. Furthermore, flexibility in design regarding the lengths of the linear unit spacers 34 increases. Therefore, a sufficient size of the air layer 225A can be provided between a prism sheet and the micro lens sheet 224 while the spacers 225 maintain sufficient bonding force between the prism sheet and the micro lens sheet 224 to maintain a proper level of optical performance of the micro lens sheet 224.

As described above, the spacers 225 in this embodiment include the linear unit spacers 34 having the linear shapes extending along the axes 225AX and being arranged along the axes 225AX. According to the configuration, the air layer 225AR exists between the adjacent linear unit spacers 34. Therefore, the micro lens sheet 224 can exert a higher level of optical performance. Furthermore, high flexibility is achieved in design regarding the lengths of the linear unit spacers 34. The sufficient size of the air layer 225AR is provided between the prism sheet and the micro lens sheet 224 while the spacers 225 maintain the sufficient bonding force between the prism sheet and the micro lens sheet 224.

Fourth Embodiment

A fourth embodiment will be described with reference to FIGS. 16 and 17. The fourth embodiment includes spacers 325 having configurations that are different from those of the first embodiment. Configurations, functions, and effects similar to those of the first embodiment will not be described.

Figure 16:
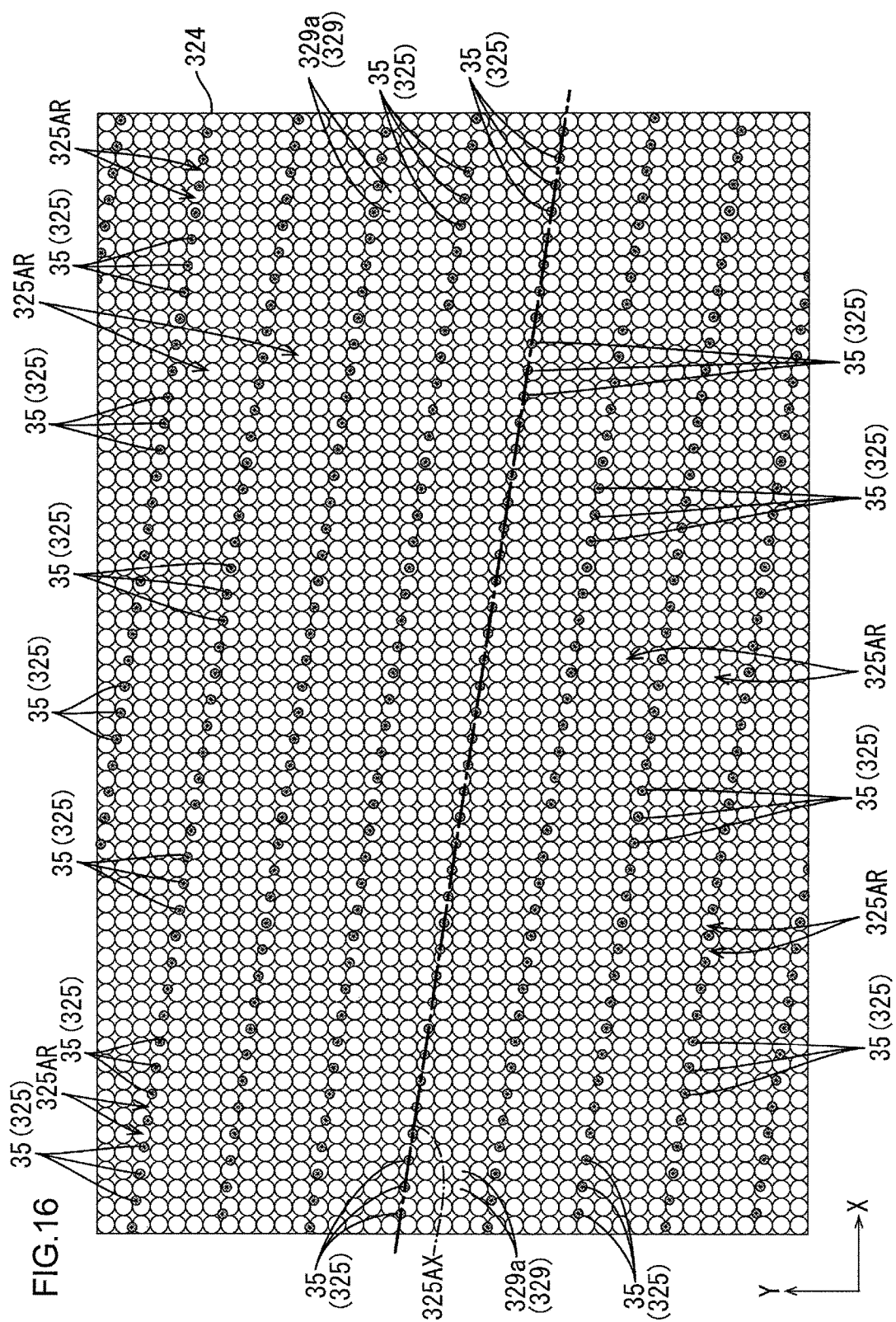
FIG. 16 is a plan view of a micro lens sheet included in a laminated type optical sheet according to a fourth embodiment of the present invention.
Figure 17:
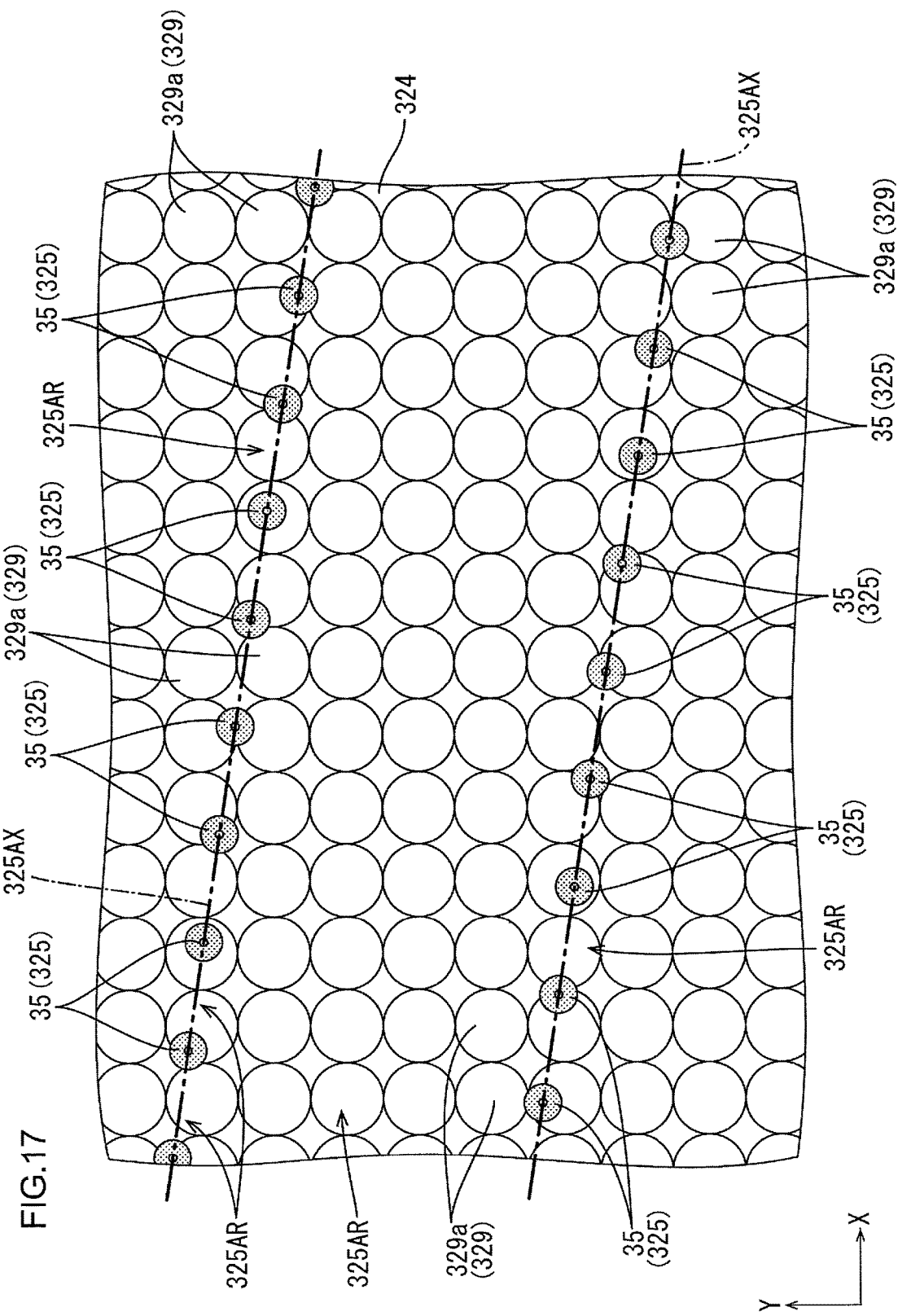
FIG. 17 is a plan view of the unit micro lenses and spacers on the micro lens sheet.

As illustrated in FIGS. 16 and 17, the spacers 325 include point unit spacers 35 arranged at predefined intervals along axes 325AX in within a plate surface of a micro lens sheet 324. Each point unit spacer 35 has a round shape in the plan view. The point unit spacer 35 has a diameter smaller than a dimension of the micro lens sheet 324 measuring in the X-axis direction (a long dimension). The point unit spacers 35 that are arranged at intervals along the same axis 325AX have diameters that are about equal to one another. The intervals of the point unit spacers 35 are about equal to one another. Namely, the spacers 325 are formed from the point unit spacers 35 in the same size in the plan view arranged at equal intervals along the axes 325AX. A distance between the adjacent point unit spacers 35 that are arranged at intervals along the same axis 325AX is smaller than a distance between the point unit spacers 35 that are adjacent to each other in the Y-axis direction. The distance between the point unit spacers 35 that are adjacent to each other in a direction along the axis 325AX is larger than the diameter of each point unit spacer 35 and larger than an interval of unit micro lenses 329a. According to the configuration, an air layer 325AR exits not only between the point unit spacers 35 that are adjacent to each other in the Y-axis direction but also between the point unit spacers 35 that are adjacent to each other in the direction along the axis 325AX. Therefore, a micro lens portion 329 can perform higher isotropic light collecting function. Furthermore, higher flexibility can be achieved in design of distribution density of the point unit spacers 35. The sufficient size of the air layer 325AR is provided between the prism sheet and the micro lens sheet 324 while the spacers 325 maintain the sufficient bonding force between the prism sheet and the micro lens sheet 324. In FIGS. 16 and 17, the point unit spacers 35 are shaded to distinguish them from unit micro lenses 329a.

As described above, the spacers 325 in this embodiment include the point unit spacers 35 that are linearly arranged along the axes 325AX within the plane of the plate surface of the micro lens sheet 324. According to the configuration, the air layer 325AR is provided between the adjacent point unit spacers 35. Therefore, the micro lens sheet 324 can exert a higher level of optical performance. Furthermore, higher flexibility can be achieved in design of the distribution density of the point unit spacers 35. The sufficient size of the air layer 325AR is provided between the prism sheet and the micro lens sheet 324 while the spacers 325 maintain the sufficient bonding force between the prism sheet and the micro lens sheet 324.

Fifth Embodiment

A fifth embodiment will be described with reference to FIGS. 18 to 21. The fifth embodiment includes a laminated type optical sheet 422 having a configuration different from that of the second embodiment. Configurations, functions, and effects similar to those of the second embodiment will not be described.

Figure 18:
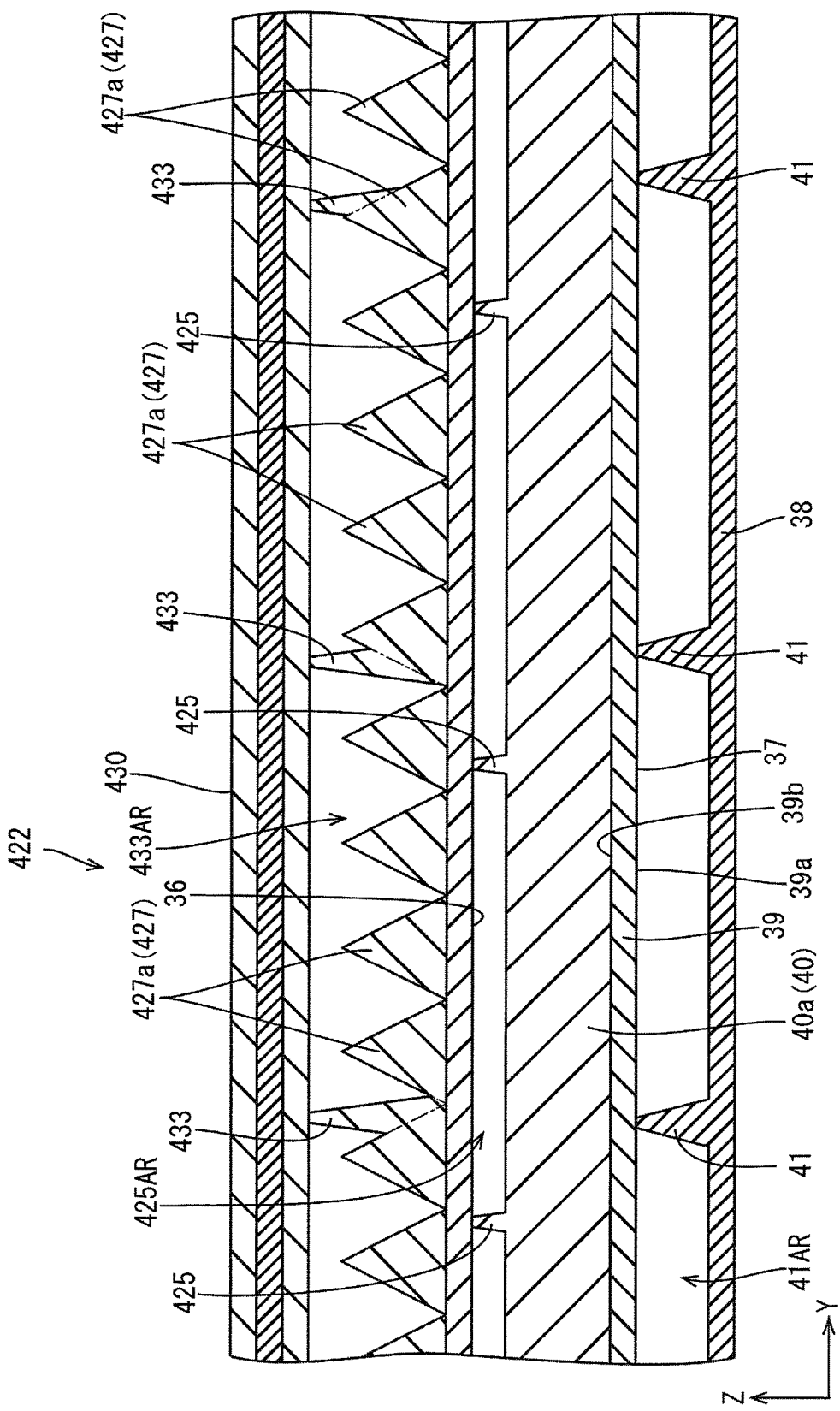
FIG. 18 is a cross sectional view illustrating a cross sectional configuration of a laminated type optical sheet along a short dimension thereof according to a fifth embodiment of the present invention.
Figure 19:
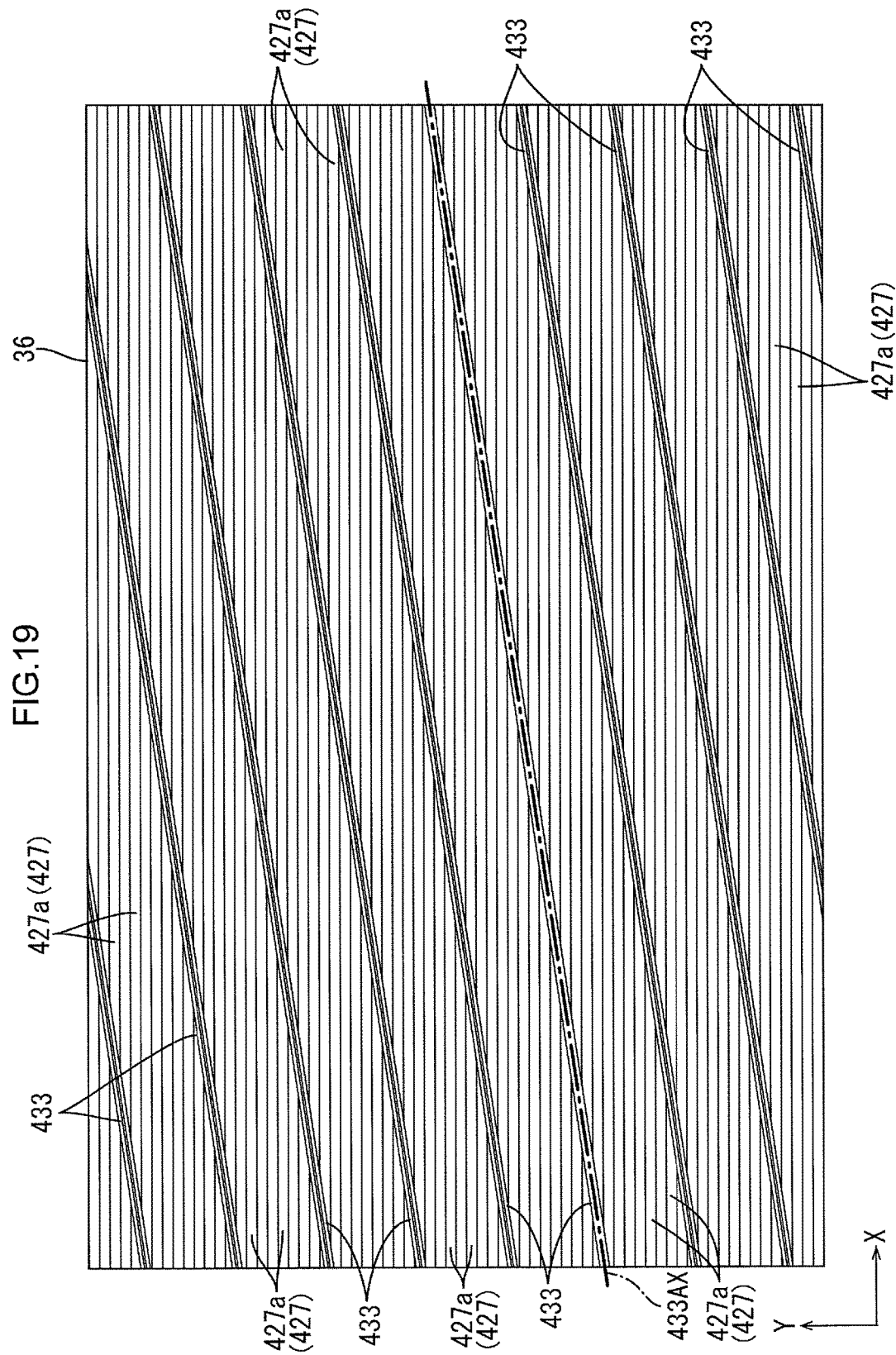
FIG. 19 is a plan view of a first prism sheet included in the laminated type optical sheet.

As illustrated in FIG. 18, the laminated type optical sheet 422 in this embodiment includes a first prism sheet 36, a second prism sheet 37, a reflective type polarizing sheet 430, and a diffuser sheet 38 (a fourth optical member). The second prism sheet is disposed on the rear side relative to the first prism sheet 36 to overlap the first prism sheet 36. The reflective type polarizing sheet 430 is disposed on the front side relative to the first prism sheet 36 to overlap the first prism sheet 36. The diffuser sheet 38 is disposed on the rear side relative to the second prism sheet 37 to overlap the second prism sheet 37. The laminated type optical sheet 422 has a four-layer structure as a whole. As illustrated in FIGS. 18 and 19, the first prism sheet 36 includes a prismportion 427 (a first prism portion) and second spacers 433. The prism portion 427 includes unit prisms 427a (first unit prisms) which extend along the X-axis direction. The second spacers 433 are bonded to the reflective type polarizing sheet 430. The configuration of the first prism sheet 36 is about the same as that of the prism sheet 123 in the second embodiment (see FIG. 11). With the second spacers 433, a second air layer 433AR is provided between the first prism sheet 36 and the reflective type polarizing sheet 430. As illustrated in FIG. 18, the configuration of the reflective type polarizing sheet 430 is about the same as the configuration of the reflective type polarizing sheet 30 in the second embodiment (see FIG. 11).

Figure 20:
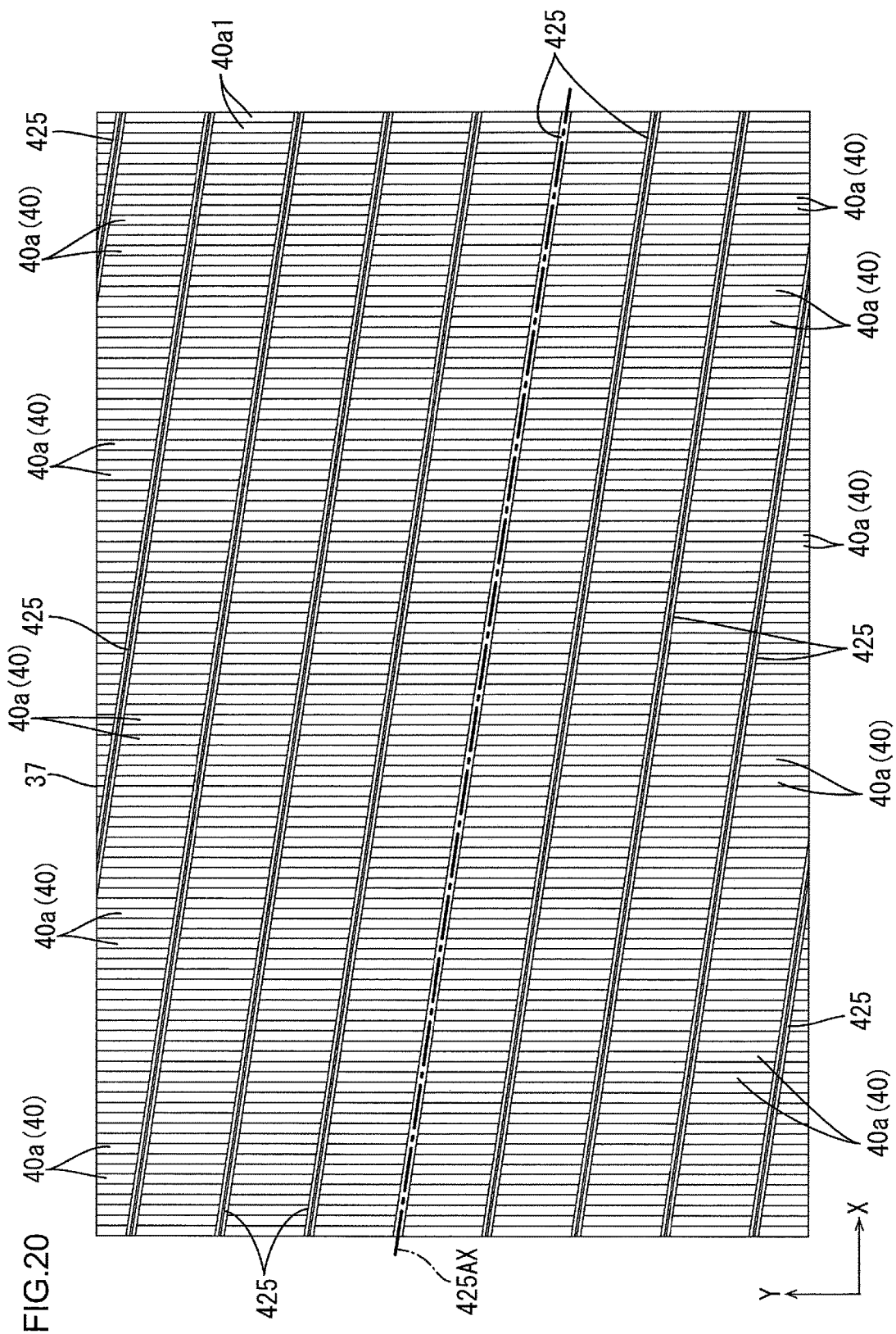
FIG. 20 is a plan view of a second prism sheet included in the laminated type optical sheet.

As illustrated in FIGS. 18 and 20, the second prism sheet 37 includes a base 39 (a second base) and a second prism portion 40 (a second optical functional portion). The base 39 has a sheet shape. The second prism portion 40 is formed on a light exiting-side plate surface 39b of the base 39 on an opposite side from a light entering-side plate surface 39a through which light rays from the diffuser sheet 38 enter. A method of producing the second prism sheet 37 and the materials of the base 39 and the second prism portion 40 are similar to those of the first embodiment. The second prism portion 40 includes second unit prisms 40a (second unit optical function sections) which protrude from the light exiting-side plate surface 39b of the base in the normal direction to the light exiting-side plate surface 39b (in the Z-axis direction) to the front side (the light exiting side). Each second unit prism 40a has a triangular cross section along the X-axis direction (a direction perpendicular to an extending direction thereof) and linearly extends in the Y-axis direction (the extending direction). The second unit prisms 40a are arranged along the X-axis direction on the light exiting-side plate surface 39b of the base 39. Namely, the second unit prisms 40a form liner shapes within a plan of the light exiting-side plate surface 39b of the base 39 with axes thereof corresponding with the Y-axis direction. The widths (dimensions measuring in the X-axis direction) of the second unit prisms 40a are constant for entire lengths thereof in the Y-axis direction. Each second unit prism 40a has an isosceles triangular cross section. Sloped surfaces 40a1 (with oblique sides) of the second unit prisms 40a are light exiting surfaces of the second prism sheet 37. The second unit prisms 40a arranged parallel to one another in the X-axis direction have about the same vertexes, about the same widths of bottom surfaces, and about the same heights. The second unit prisms 40a are arranged at about equal intervals. Specifically, each interval of the second unit prisms 40a is about 50 μm, that is about equal to the interval of unit prisms 428a of the first prism sheet 36 or the interval of the same color pixels (the unit pixels) of the display pixels. Spacers 425 similar to those of the first embodiment are integrally formed with the second prism portion 40 having such a configuration. The spacers 425 are made of a material the same as the material of the second prism portion 40. The spacers 425 and the second prism portion 40 are formed and cured in the same process. An air layer 425AR is provided between the second prism sheet 37 and the first prism sheet 36 with the spacers 425 disposed between the second prism sheet 37 and the first prism sheet 36.

According to the second prism sheet 37 having such a configuration, as illustrated in FIG. 18, when the light rays entering the base 39 through the light entering-side plate surface 39a and exiting through the light exiting-side plate surface 39b enter the second unit prisms 40a of the second prism portion 40, the light rays are refracted at interfaces between the sloped surfaces 40a1 and the air layer 425AR at angles corresponding to the incidences and the refractive index of the second prism portion 40 when exiting the second unit prisms 40a through the sloped surfaces 40a1. The light rays exiting the second unit prisms 40a through the sloped surfaces 40a1 are controlled to travel in directions closer to the frontward direction with respect to the X-axis direction that is the arrangement direction of the second unit prisms 40a. Namely, the light collecting effects are selectively exerted on the light rays passing through the second prism sheet 37 with respect to the X-axis direction. The light collecting direction of the second prism sheet 37 is perpendicular to the light collecting direction of the first prism sheet 36. With the spacers 425 between the second prism sheet 37 and the first prism sheet 36, the air layer 425AR is provided and thus the second prism sheet 37 properly performs the anisotropic light collecting function of, which is the optical performance.

Figure 21:
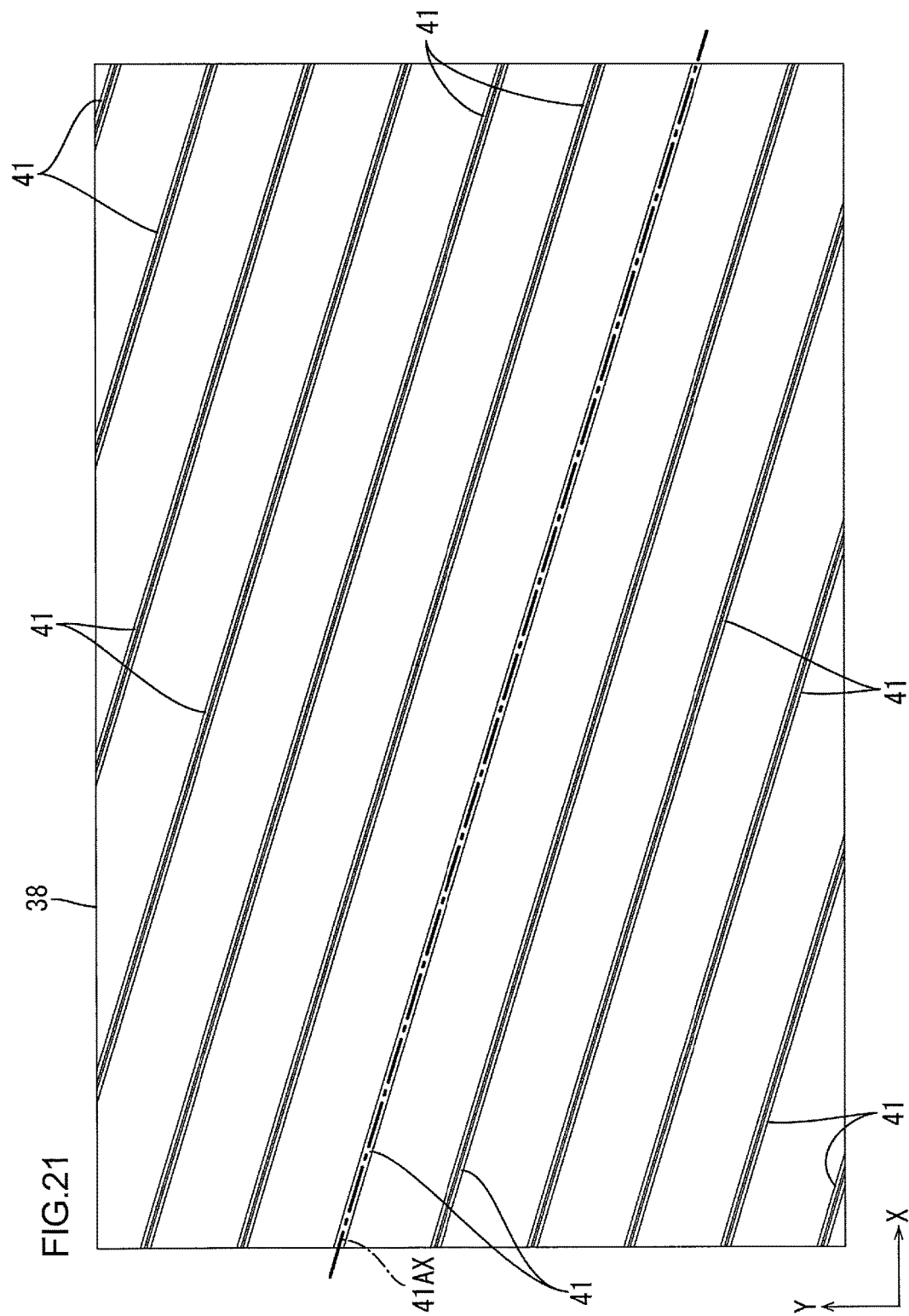
FIG. 21 is a plan view of a diffuser sheet included in the laminated type optical sheet.

As illustrated in FIGS. 18 and 21, the diffuser sheet 38 includes a base and diffusing particles dispersed in the base. The base is made of ultraviolet curable resin material having sufficient light transmissivity. The diffusing particles are for diffusing light. In a production of the diffuser sheet 38, a forming die is filled with the ultraviolet curable resin material before cured and the diffusing particles sprayed. As a result a forming surface of the die is transferred onto the ultraviolet curable resin material before cured. Then, the ultraviolet rays are applied to the ultraviolet curable resin material before cured. The ultraviolet curable resin material is cured and the diffuser sheet 38 is prepared. The ultraviolet curable resin material of the diffuser sheet 38 may be an acrylic resin material such as PMMA with the refractive index of about 1.59. Third spacers 41 are disposed between the diffuser sheet 38 and the second prism sheet 37 to form a third air layer 41AR. The third spacers 41 have mainly a function for holding (providing) the third air layer 41AR between the second prism sheet 37 and the diffuser sheet 38 and a function for bonding the second prism sheet 37 and the diffuser sheet 38 to combine them together. The third spacers 41 are provided within the plate surfaces of the second prism sheet 37 and the diffuser sheet 38 with a predefined occupancy rate (a rate of areas of the third spacers 41 in a plan view per a total area of the plate surface of the second prism sheet 37 or the diffuser sheet 38). The reciprocal of the occupancy rate is about equal to an occupancy rate of the third air layer 41AR (a rate of an area of the third air layer 41AR in the plan view per the total area of the plate surface of the second prism sheet 37 or the diffuser sheet 38). As the occupancy rate of the third spacers 41 increases, a bonding force between the second prism sheet 37 and the diffuser sheet 38 increases. However, the occupancy rate of the third air layer 41AR decreases and the diffuser sheet 38 is less likely to exert the optical performance. As the occupancy rate of the third spacers 41 decreases, the occupancy rate of the third air layer 41AR increases and the diffuser sheet 38 is more likely to exert the optical performance. However, the bonding force between the second prism sheet 37 and the diffuser sheet 38 decreases.

Specifically, as illustrated in FIG. 18, the third spacers 41 are provided to connect the base 39 of the second prism sheet 37 (a portion on the fourth optical member side) to a front portion of the diffuser sheet 38 (a portion on a second optical member side). The third spacers 41 are made of a material the same as the material of the base of the diffuser sheet 38 and formed integrally with the base in the same step of production of the diffuser sheet 38. Specifically, a transfer pattern for forming the third spacers 41 is formed in a forming surface of a forming die for forming the diffuser sheet 38 used in the production of the diffuser sheet 38. Therefore, the third spacers 41 can be formed together with the diffuser sheet 38 in the same step. The third spacers 41 formed together with the diffuser sheet 38 are cured with the ultraviolet rays applied thereto in a step of curing the diffuser sheet 38. Before collectively curing the diffuser sheet 38 and the third spacers 41 with the ultraviolet rays, the light entering-side plate surface 39a of the base 39 of the second prism sheet 37 is placed such that tips of the third spacers 41 before cured are in contact with the light entering-side plate surface 39a. When the diffuser sheet 38 and the third spacers 41 are collectively cured with the ultraviolet rays, the tips of the third spacers 41 are bonded (fixed) to the light entering-side plate surface 39a of the base 39 of the second prism sheet 37. As a result, the second prism sheet 37 and the diffuser sheet 38 are layered and held (bonded) together. As described above, the diffuser sheet 38 and the third spacers 41 are formed using the same forming die in the same step and the diffuser sheet 38 and the third spacers 41 are cured with the ultraviolet rays in the same step. Furthermore, the second prism sheet 37 and the diffuser sheet 38 are bonded together in the ultraviolet curing step. This configuration is preferable for reducing the production cost of the laminated type optical sheet 422.

As illustrated in FIG. 18, each third spacer 41 columnar shape with a triangular cross section (a pyramid shape). As illustrated in FIG. 21, each third spacer 41 has a linear shape in the plan view. The third spacer 41 extends along the plate surface of the diffuser sheet 38 and along a third axis 41AX that is tilted at a predefined angle relative to the X-axis direction. An overall shape of the third spacer 41 is a wall shape (a rail shape) with a predefined thickness. In FIG. 21, one third axis 41AX is indicated with a chain line. As described earlier, the arrangement directions of the display pixels for display images correspond with the X-axis direction and the Y-axis direction in the liquid crystal panel. Each third spacer 41 linearly extends with the third axis 41AX tilted at a predefined angle relative to the arrangement direction of the display pixels in the liquid crystal panel (see FIG. 6). The third axis 41AX of the third spacer 41 is parallel to the plate surface of the diffuser sheet 38 and tilted in the clockwise direction relative to the X-axis direction (declines toward the right in FIG. 21) in the plan view. The tilting angle of the third axis 41AX is larger than the tilting angle of a second axis 433AX of each second spacer 433 on the second prism sheet 37. The tilting angle of the third axis 41AX relative to the X-axis direction is about twice of the tilting angle of the third axis 41AX of the third spacer 41 relative to the second axis 433AX of the second spacer 433 (e.g., about 17°). As illustrated in FIGS. 19 and 21, the third axis 41AX of each third spacer 41 crosses an axis 425AX of the corresponding spacer 425 on the first prims sheet 36. As illustrated in FIG. 21, the third spacers 41 linearly extend without any breaks for an entire length of the diffuser sheet 38 in the X-axis direction. The third spacer 41 has a width that gradually decreases from a base side to a tip side (a base 39 side) in the Z-axis direction (a normal direction to the plate surface of the diffuser sheet 38) (see FIG. 18).

As illustrated in FIG. 21, the third axis 41AX that is a reference for the extension of the third spacer 41 is tilted at the angle equal or greater than 3° relative to the X-axis direction (the arrangement direction of the display pixels). Therefore, the third spacer 41 having the third axis 41AX is less likely to interfere with display pixels (see FIG. 6). Therefore, the fringe patterns that are also referred to as the Moire fringes are less likely to occur. As illustrated in FIGS. 19 and 21, the third spacers 41 are oriented such that the third axis 41AX of each third spacer 41 is tilted at an angle equal to or greater than 3° relative to the second axis 433AX of each second spacer 433. Therefore, the third spacers 41 are less likely to interfere with the spacers 425 and the second spacers 433. The fringe patterns that are also referred to as the Moire fringes are further properly reduced. If the tilting angle of the third axis 41AX of the third spacer 41 relative to the X-axis direction, the axis 425AX of the spacer 425, or the second axis 433AX of the second spacer 433 is smaller than 3°, a sufficient level of the interference reduction effect may not be achieved. As illustrated in FIG. 21, the third spacer 41 linearly extends for the entire length of the diffuser sheet 38 in the X-axis direction. The transfer pattern in the forming surface of the die, which is for forming diffuser sheet 38 and the third spacers 41 includes substantially linear grooves, that is, the transfer pattern is simple. In a production of the die, the transfer pattern for forming the third spacers 41 can be easily formed in the forming surface of the die. This is preferable for reducing the production cost of the die and the production cost of the laminated type optical sheet 422. Furthermore, the heights of the third spacers 41 can be easily equalized. This is preferable for equalizing the distances between the second prism sheet 37 and the diffuser sheet 38 within the plate surfaces thereof. Furthermore, the third spacers 41 exert a larger bonding force between the second prism sheet 37 and the diffuser sheet 38. As illustrated in FIG. 21, the third spacers are arranged ate intervals in the Y-axis direction perpendicular to the X-axis direction (a direction that crosses the third axis 41AX). Specifically, each interval between the third spacers 41 that area adjacent to each other in the Y-axis direction is about equal to each interval of the spacers 425 and each interval of the second spacers 433.

Sixth Embodiment

A sixth embodiment will be described with reference to FIG. 22. The sixth embodiment includes a laminated type optical member 42 that includes a laminated type optical sheet 522 as in the second embodiment. The laminated type optical sheet 522 is integrated with a liquid crystal panel 511. Configurations, functions, and effects similar to those of the second and the fifth embodiments will not be described.

Figure 22:
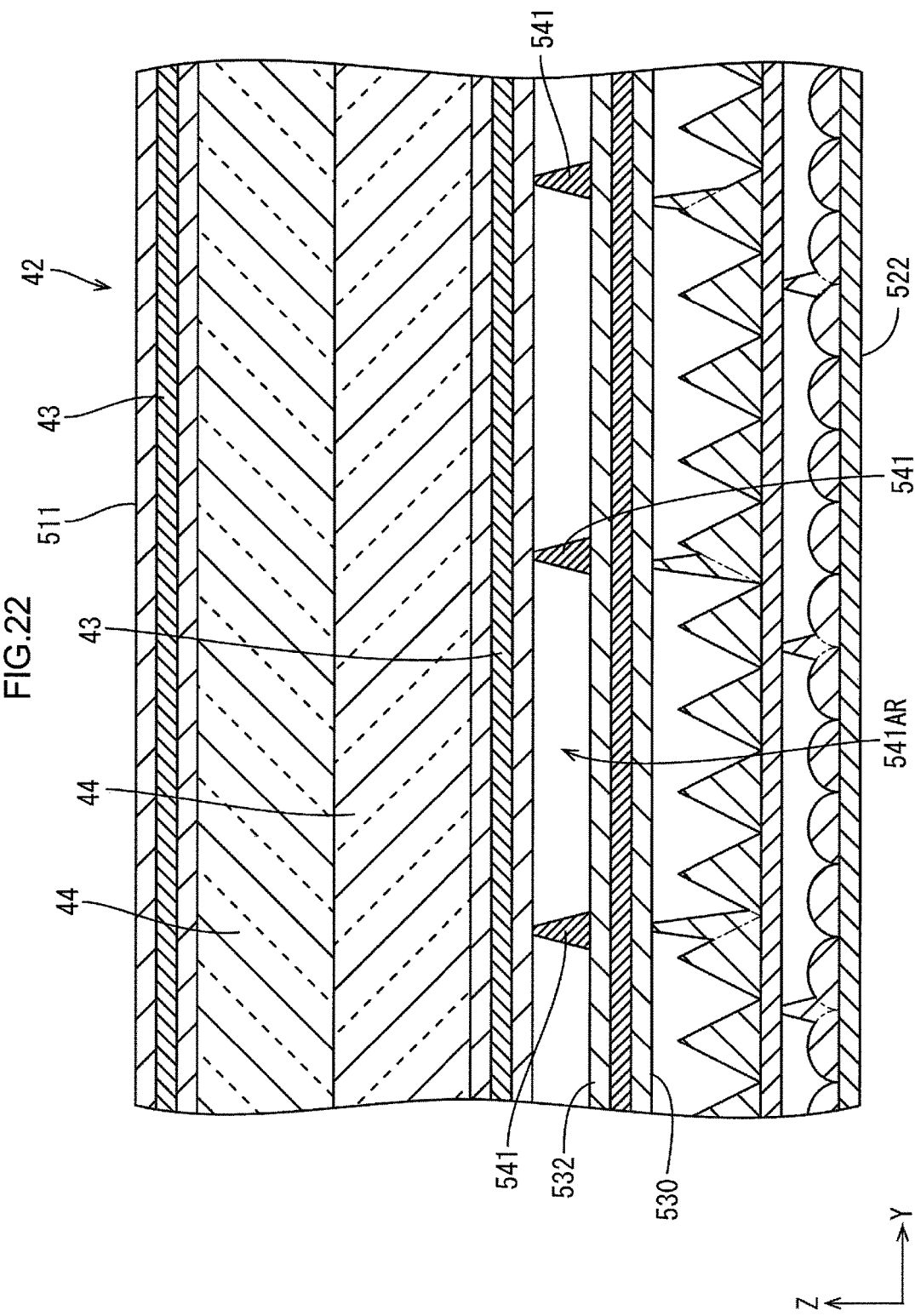
FIG. 22 is a cross sectional view illustrating a cross sectional configuration of the laminated type optical member along a short dimension thereof according to a sixth embodiment of the present invention.

As illustrated in FIG. 22, the laminated type optical member 42 in this embodiment includes the laminated type optical sheet 522 and the liquid crystal panel 511. The liquid crystal panel 511 is disposed on the front side relative to the laminated type optical sheet 522 to overlap the laminated type optical sheet 522. Third spacers 541 are formed on a reflective type polarizing sheet 530 on the front side in the laminated type optical sheet 522 to hold a gap between the reflective type polarizing sheet 530 and the liquid crystal panel 511 to form a third air layer 541AR. The third spacers 541 have mainly a function for holding (providing) the third air layer 541AR between the reflective type polarizing sheet 530 and the liquid crystal panel 511 and a function for bonding the reflective type polarizing sheet 530 and the liquid crystal panel 511 to combine them together. The third spacers 541 are made of the ultraviolet curable resin material similarly to the fifth embodiment. In a production, a forming die is filled with the ultraviolet curable resin material and the ultraviolet curable resin material is shaped. The shaped members are placed on a diffuser film 532 on the front side in the reflective type polarizing sheet 530 that is separately prepared and cured with the ultraviolet rays. As a result, the third spacers 541 are formed on the reflective type polarizing sheet 530. Before curing the third spacers 541 with the ultraviolet rays, a rear plate surface of a polarizing plate 43 on the rear side in the liquid crystal panel 511 is placed such that tips of the third spacers 541 before cured are in contact with the rear plate surface of the polarizing plate 43. When the third spacers 541 are cured with the ultraviolet rays, the tips of the third spacers 541 are bonded (fixed) to the rear plate surface of the polarizing plate 43 on the rear side in the liquid crystal panel 511. According to the configuration, the liquid crystal panel 511 and the reflective type polarizing sheet 530 in the laminated type optical sheet 522 are laid on top of each other and held (bonded). The liquid crystal panel 511 includes a pair of glass substrates 44 and a pair of polarizing plates 43 that are attached to outer surfaces of the glass substrates 44.

As described above, in this embodiment, the liquid crystal panel 511 is configured as a first optical member. The configuration of the liquid crystal display device according to this embodiment in which the first optical member of the laminated type optical member 42 is the liquid crystal panel 511 is preferable for reducing the production cost and the thickness of the device.

Seventh Embodiment

A seventh embodiment will be described with reference to FIG. 23 or 24. The seventh embodiment includes an edge light type backlight unit 612 having a configuration different from that of the first embodiment. Configurations, functions, and effects similar to those of the first embodiment will not be described.

Figure 23:
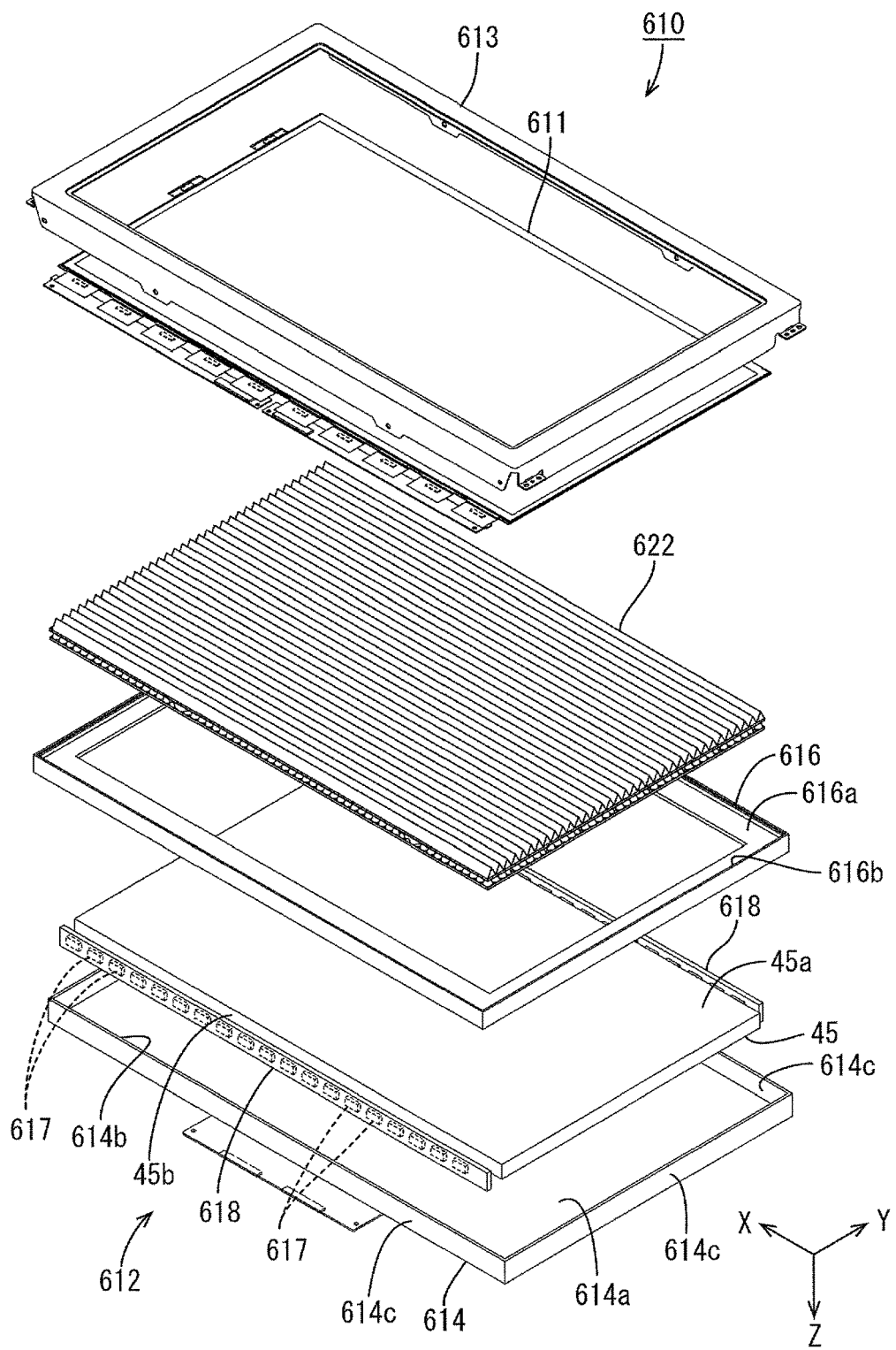
FIG. 23 is an exploded perspective view illustrating a schematic configuration of a liquid crystal display device according to a seventh embodiment of the present invention.

As illustrated in FIG. 23, a liquid crystal display device 610 according to this embodiment includes a liquid crystal panel 611, the edge light type backlight unit 612, and a bezel 613. The liquid crystal panel 611 and the edge light type backlight unit 612 are combined together with the bezel 613. The configuration of the liquid crystal panel 611 is similar to that of the first embodiment and thus will not be described. The configuration of the edge light type backlight unit 612 will be described.

As illustrated in FIG. 23, the backlight unit 612 includes a chassis 614 and a laminated type optical sheet 622. The chassis 614 has a box-like shape and includes a light exiting portion 614b with an opening on the front side (a liquid crystal panel 611 side. The laminated type optical sheet 622 is disposed to cover the light exiting portion 614b. The backlight unit 612 further includes LEDs 617, LED boards 618, a light guide plate 45, and a frame 616. The LEDs 617 are light sources. The LEDs 617 are mounted on the LED boards 618. The light guide plate 45 is configured to direct light rays from the LEDs 617 to the laminated type optical sheet 622 (the liquid crystal panel 611). The frame 616 is press the light guide plate 45 from the front side. The backlight unit 612 is a so-called edge light type (a side light type) backlight unit including the LED boards 618 on which the LEDs 617 are mounted disposed on long sides thereof and the light guide plate 45 between the LED boards 618. Because the backlight unit 612 in this embodiment is the edge light type backlight unit, the backlight unit 612 does not include the diffuser lenses 19 and the reflection sheet 20 included in the direct type backlight unit 12 in the first embodiment. The components of the backlight unit 612 will be described in detail.

The chassis 614 is made of metal. As illustrated in FIGS. 23 and 24, the chassis 614 includes a bottom portion 614a and side portions 614c. The bottom portion 614a has a horizontally-long rectangular shape similar to the liquid crystal panel 611. The side portions project upward from outer edges of the bottom portion 614a, respectively. The chassis 614 has a box-like overall shape with an opening on the front side. The long dimension and the short dimension of the chassis 614 (the bottom portion 614a) are along the X-axis direction (the horizontal direction) and the Y-axis direction (the vertical direction), respectively. The frame 616 and the bezel 613 can be fixed to the side portions 614c. The laminated type optical sheet 622 has a configuration similar to that of the first embodiment and thus will not be described.

As illustrated in FIG. 23, the frame 616 includes a frame portion 616a that extends along outer edges of the light guide plate 45. The outer edges of the light guide plate 45 are pressed by the frame portion 616a from the front side for an about entire periphery. As illustrated in FIG. 24, first reflection sheets 46 are attached to back surfaces of long edge sections of the frame portion 616a of the frame 616, that is, opposed surfaces that are opposed to the light guide plate 45 and the LED boards 618 (the LEDs 617). Each first reflection sheet 46 has a dimension to extend for an about entire length of the long edge section of the frame portion 616a. The first reflection sheets 46 are directly in contact with end portions of the light guide plate 45 on the LED 617 sides. Each first reflection sheet 46 collectively covers the corresponding end portion of the light guide plate 45 and the corresponding LED board 618 from the front side. The frame 616 holds the outer edges of the laminated type optical sheet 622 from the rear side with the frame portion 616a that presses the light guide plate 45 from the front side. The laminated type optical sheet 622 is held with a predefined gap (an air layer) between the laminated type optical sheet 622 and a light exiting surface 45a of the light guide plate 45, which will be described later. Furthermore, the frame 616 includes liquid crystal panel holding portion 616b that protrude from the frame portion 616a to the front side and holds the outer edges of the liquid crystal panel 611 from the rear side.

The configuration of the LEDs 617 are similar to that of the first embodiment and thus will not be described. As illustrated in FIG. 23, each LED board 618 has an elongated plate shape that extends along the long dimension of the chassis 614 (the X-axis direction, a long dimension of light entering surfaces 45b of the light guide plate 45). The LED boards 618 are held in the chassis 614 with main plate surfaces thereof parallel to the X-axis direction and the Z-axis direction, that is, perpendicular to plate surfaces of the liquid crystal panel 611 and the light guide plate 45 (the laminated type optical sheet 622). The LED boards 618 are disposed to sandwich the light guide plate 45 from sides of the short dimension of the light guide plate 45 (in the Y-axis direction). The LEDs 17 are mounted on the main surfaces of the LED boards 618 on inner sides, that is, the surfaces facing the light guide plate 45 (opposed surfaces that are opposed to the light guide plate 45). The LEDs 617 are arranged in line (linearly arranged) on a mounting surface of each LED board 618 along the length direction of the LED board 618 (the X-axis direction). Multiple LEDs 617 are arranged on each long side of the backlight unit 612 in the long dimension. The LEDs 617 mounted on each LED board 618 are connected in series with a board wiring trace (not illustrated). The LED boards 618 are held in the chassis 614 with the mounting surfaces on which the LEDs 617 are mounted are opposed to each other. Therefore, light emitting surfaces of the LEDs 617 mounted on one of the LED boards 618 are opposed to light emitting surfaces of the LEDs 617 mounted on the other LED board 618. Optical axes of the LEDs 617 substantially correspond with the Y-axis direction.

The light guide plate 45 is made of substantially transparent synthetic resin material having a refractive index sufficiently larger than that of the air and high light transmissivity (e.g., an acrylic resin material such as PMMA). As illustrated in FIG. 23, the light guide plate 45 has a horizontally-long rectangular shape in a plan view similar to the liquid crystal panel 611 and the chassis 614. The long dimension and the short dimension of the light guide plate 45 are along the X-axis direction and the Y-axis direction. The light guide plate 45 is disposed under the liquid crystal panel 611 and the laminated type optical sheet 622 in the chassis 614. The light guide plate 45 is sandwiched between the LED boards 618 that are disposed at the long edges of the chassis 614 with respect to the Y-axis direction. The arrangement direction of the LEDs 617 (the LED boards 618) and the light guide plate 45 corresponds with the Y-axis direction. The arrangement direction of the laminated type optical sheet 622 (the liquid crystal panel 611) and the light guide plate 45 corresponds with the Z-axis direction. Therefore, the arrangement directions are perpendicular to each other. The light guide plate 45 is configured to pass light rays emitted by the LEDs 617 in the Y-axis direction and entering the light guide plate 45 and direct the light rays toward the laminated type optical sheet 622 (in the Z-axis direction).

As illustrated in FIG. 28, the plate surface of the light guide plate 45 facing the front side is configured as the light exiting surface 45a through which the light rays exiting from the light guide plate toward the laminated type optical sheet 622 and the liquid crystal panel 611. Amount the outer end surfaces of the light guide plate adjacent to the plate surfaces, the long end surfaces having elongated shapes along the X-axis direction are opposed to the LEDs 617 (the LED boards 618) with a predefined gap and configured as light entering surfaces 45b through which the light rays emitted by the LEDs 617 enter. The light entering surfaces 45b are parallel to the X-axis direction and the Z-axis direction and substantially perpendicular to the light exiting surface 45a. A second reflection sheet 47 is disposed on a plate surface 45c on an opposite side from the light exiting surface 45a of the light guide plate 45 to cover an entire area of the plate surface 45c. The second reflection sheet 47 is configured to reflect the light rays in the light guide plate 45 to the front side. The second reflection sheet 47 also covers an area overlapping the LED board boards 618 (the LEDs 617) in the plan view. The second reflection sheet 47 is disposed such that the LED boards 618 (the LEDs 617) are sandwiched between the first reflection sheet 46 on the front side and the second reflection sheet 47. According to the configuration, the light rays from the LEDs 617 are repeatedly reflected by the reflection sheets 46 and 47 and thus the light rays efficiently enter through the light entering surfaces 45b. At least one of the light exiting surface 45a and the opposite plate surface 45c of the light guide plate 45 includes a reflection portion for reflecting the light rays inside (not illustrated) or a scattering portion for scattering the light rays inside (not illustrated) with predefined in-plane distribution formed through patterning. With such a portion, the light rays exiting through the light exiting surface 45a are controlled to have uniform in-plane distribution.

With the laminated type optical sheet 622 includes in the edge light type backlight unit 612, the functions and effects similar to those of the first embodiment can be achieved.

Other Embodiments

The present invention is not limited to the above embodiments described in the above sections and the drawings. For example, the following embodiments may be included in technical scopes of the technology.

(1) The kinds of the sheet included in the optical sheets may be altered from those of the first, the second, and the fifth embodiments as appropriate. For example, the micro lens sheet on the rear side in the laminated type optical sheet having the two-layered structure included in the first embodiment may be replaced with the diffuser sheet included in the fifth embodiment. The sequence of the layers may be altered (by disposing the diffuser sheet on the front side and the prism sheet on the rear side). The micro lens sheet on the rear side in the laminated type optical sheet having the two-layered structure included in the first embodiment may be replaced with the second prism sheet included in the fifth embodiment. Each of the rearmost micro lens sheet and the front reflective type polarizing sheet in the laminated type optical sheet having the three-layered structure included in the second embodiment may be replaced with the diffuser sheet included in the fifth embodiment. As a modification of the fifth embodiment, a laminated type optical sheet having a three-layered structure may be provided by removing the rearmost diffuser sheet or the front reflective type polarizing sheet. Other than the above examples, the combination, the sequence, and the kinds of the sheets can be altered as appropriate.

(2) In the sixth embodiment, the laminated type optical member is prepared by laying the laminated type optical sheet included in the second embodiment on the liquid crystal panel and bonded to the liquid crystal panel. However, the laminated type optical member may be prepared by laying the laminated type optical sheet included in the first embodiment or the fifth embodiment on the liquid crystal panel and bonded to the liquid crystal panel. Alternatively, any one of the laminated type optical sheets in the above (1) may be laid on the liquid crystal panel and bonded to the liquid crystal panel.

(3) The first, the second, and the fifth embodiments include the laminated type optical sheet having the two-layered structure, the three-layered structure, and the four-layered structure, respectively. However, the present invention can be applied to laminated type optical sheets having five or more layered structures.

(4) The first, the second, and the fifth embodiments include the spacers that are made of the same materials as those of at least portions of the sheets included in the laminated type optical sheets. However, the spacers may be made of materials that are different from those of the sheets included in the laminated type optical sheets.

(5) In each of the above embodiments, the axes of the spacers are tilted at the angle of 8.5° relative to the X-axis direction, which is the arrangement direction of the display pixels. However, the angle may be altered within the range from 3° to 37° (preferable range is from 7° to 10°).

(6) In each of the above embodiments, the axes of the spacers are tilted at the angle equal to or greater than 3° relative to the X-axis direction, which is the arrangement direction of the display pixels. However, the axes of the spacer may be tilted at an angle equal to or greater than 3° relative to the Y-axis direction, which is the arrangement direction of the display pixels.

(7) In each of the above embodiments, the intervals of the spacers arranged along the direction that crosses the axes (the Y-axis direction) are equal to one another. However, the intervals of the spacers arranged along the direction that crosses the axes may not be equal to one another. The equal intervals or unequal intervals of the spacers arranged along the direction that crosses the axes may be altered as appropriate.

(8) The spacers in the third embodiment or the forth embodiment may be used for the laminated type optical sheets and the laminated type optical members in the second and the fifth to the seventh embodiments.

(9) In the third embodiment, the lengths of the linear unit spacers arranged along the axes are not equal to one another. However, the lengths of the linear unit spacers arranged along the axes may be equal to one another. The lengths of the linear unit spacers arranged along the axes may be altered whether the lengths are equal to one another or not.

(10) In the third embodiment, the lengths of the linear unit spacers arranged along the direction that crosses the axes (the Y-axis direction) are equal to one another. However, the lengths of the linear unit spacers arranged along the direction that crosses the axes may not be equal to one another. The lengths of the linear unit spacers arranged along the direction that crosses the axes may be altered whether the lengths are equal to one another or not.

(11) In the third embodiment, the intervals of the linear unit spacers arranged along the axes are equal to one another. However, the intervals of the linear unit spacers arranged along the axes may not be equal to one another. The intervals of the linear unit spacers arranged along the axes may be altered whether the intervals are equal to one another or not.

(12) In the fourth embodiment, the diameters of the point unit spacers arranged along the axes are equal to one another. However, the diameters of the point unit spacers arranged along the axes may not be equal to one another. The diameters of the point unit spacers arranged along the axes may be altered whether the diameters are equal to one another or not.

(13) In the fourth embodiment, the intervals of the point unit spacers arranged along the axes are equal to one another. However, the intervals of the point unit spacers arranged along the axes may not be equal to one another. The intervals of the point unit spacers arranged along the axes may be altered whether the intervals are equal to one another or not.

(14) The spacers may be configured from a combination of the linear unit spacers arranged along the axes in the third embodiment and the point unit spacers in the fourth embodiment.

(15) In each of the above embodiments, the spacers are disposed between all the sheets included in the laminated type optical sheet. As long as a sufficient level of optical performance is achieved, it is not necessary to dispose the spacers between all the sheets. The spacers may not be disposed between some of the sheets. In such a case, an adhesive layer may be formed in a solid pattern between the sheets without the spacers to bond the sheets together to integrate.

(16) As a modification of the second embodiment, the second axes of the second spacers on the prism sheet may be tilted at an angle equal to or greater than 3° in the clockwise direction relative to the axes of the spacers on the micro lens sheet in the plan view. Alternatively, the axes of the spacers on the micro lens sheet may be tilted at an angle equal to or greater than 3° in the counterclockwise direction relative to the second axes of the second spacers on the prism sheet in the plan view.

(17) As a modification of the fifth embodiment, the second axes of the second spacers on the first prism sheet may be tilted at an angle equal to or greater than 3° in the clockwise direction relative to the axes of the spacers on the second prism sheet or the third axes of the third spacers on the diffuser sheet in the plan view. Alternatively, the axes of the spacers on the second prism sheet of the third axes of the third spacers on the diffuser sheet may be tilted at an angle equal to or greater than 3° in the counterclockwise direction relative to the second axes of the second spacers on the first prism sheet in the plan view. The third axes of the third spacers on the diffuser sheet may be tilted at an angle equal to or greater than 3° in the counterclockwise direction relative to the axes of the spacers on the second prism sheet in the plan view. Alternatively, the axes of the spacers on the second prism sheet may be tilted at an angle equal to or greater than 3° in the counterclockwise direction relative to the third axes of the third spacers on the diffuser sheet.

(18) In the fifth embodiment, the diffuser sheet is produced through injection molding using the forming die. However, the diffuser sheet may be produced through extrusion.

(19) In the fifth embodiment, the base of the diffuser sheet is made of the ultraviolet curable resin material. However, the baser of the diffuser sheet may be made of thermoplastic resin material.

(20) In the sixth embodiment, the third spacers made of ultraviolet curable resin material are formed on the reflective type polarizing sheet. However, third spacers made of optical clear adhesive may be formed on the reflective type polarizing sheet. In such a case, it is preferable to use a soft molding method.

(21) The laminated type optical sheet in the seventh embodiment may be replaced with any one of the laminated type optical sheets in the second to the sixth embodiments.

(22) In each of the above embodiments, the spacers are made of the ultraviolet curable resin material. However, a light curable resin material that is cured with light rays with a wavelength other than the ultraviolet rays such as visible light rays, a thermoplastic resin material, and an OCA may be used.

(23) The intervals of the same color pixels included in the display pixels in the liquid crystal display panel, the intervals of the unit prisms in the prism sheet, and the intervals of the unit micro lenses in the micro lens sheet may be altered from those in each other above embodiments.

(24) In each of the above embodiments, the LEDs are used for the light source. However, other types of light sources such as organic ELs may be used.

(25) In each of the above embodiments, the liquid crystal panel and the chassis are in the upright position with the short-side directions corresponding with the vertical direction. However, the liquid crystal panel and the chassis may be in the upright portion with the long-side directions corresponding with the vertical direction.

(26) In each of the above embodiments, the TFTs are used for the switching components of the liquid crystal display device. However, the present invention can be applied to a liquid crystal display device including switching components other than the TFTs (e.g., thin film diodes (TFD)). Furthermore, the present invention can be applied to a black-and-white liquid crystal display other than the color liquid crystal display.

(27) In each of the above embodiments, the transmissive type liquid crystal display device is provided. However, the present invention can be applied to a reflective type liquid crystal display device or a semitransmissive type liquid crystal display device.

(28) In each of the above embodiments, the liquid crystal display device including the liquid crystal panel as a display panel is provided. However, the present invention can be applied to display devices including other types of display panels.

(29) In each of the above embodiments, the television device including the tuner is provided is provided. However, the present invention can be applied to a display device without a tuner. Specifically, the present invention can be applied to a liquid crystal display panel used in a digital signage or an electronic blackboard.

EXPLANATION OF SYMBOLS

10: Liquid crystal display device (display device)
10TV: Television device
11, 511: Liquid crystal panel (display panel, first optical member)
11PX: Display pixel (pixel)
12: Backlight unit (lighting device)
17: LED (light source)

22, 122, 422, 522: Laminated type optical sheet (laminated type optical member)
23, 123: Prism sheet (first optical member)
24, 124, 224, 324: Micro lens sheet (second optical member)
25, 125, 225, 325, 425: Spacer
25AR, 225AR, 325AR, 425AR: Air layer
25AX, 125AX, 225AX, 325AX, 425AX: Axis
28: Base
29, 229, 329: Micro lens portion (lens portion)
29a, 229a, 329a: Unit micro lenses (unit lenses)
30, 430, 530: Reflective type polarizing sheet (third optical member)
33, 433: Second spacer
33AR, 433AR: Second air layer
33AX, 433AX: Second axis
34: Linear unit spacer
35: Point unit spacer
36: First prism sheet (first optical member)
37: Second prism sheet (second optical member)
38: Diffuser sheet (third optical member)
39: Base
40: Second prism portion (lens portion)
40a: Second unit prism (unit prism)
41, 541: Third spacer (second spacer)
41AR, 541AR: Third air layer (second air layer)
41AX: Third axis (second axis)
42: Laminated type optical member

The invention claimed is:

1. A laminated type optical member used in a display device to display an image based on pixels arranged in a matrix, the laminated type optical member comprising:
a first optical member;
a second optical member disposed on a light entering side relative to the first optical member with a first gap between the first optical member and the second optical member to overlap the first optical member; and
first spacers disposed between the first optical member and the second optical member to maintain the first gap between the first optical member and the second optical member to define a first air layer, wherein
the second optical member includes hemisphere lenses disposed in rows and columns across substantially an entirety of a plate surface of the second optical member that is closest to the first optical member and coupled to each other in a row direction and a column direction, and
the first spacers have linear shapes that extend in an extending direction along the plate surface of the second optical member with axes that are angled relative to an arrangement direction of the pixels and that protrude toward the first optical member from the hemisphere lenses that extend along the extending direction.

2. The laminated type optical member according to claim 1, wherein the first spacers are oriented such that the axes are tilted at an angle equal to or greater than 3° relative to the arrangement direction of the pixels.

3. The laminated type optical member according to claim 2, wherein the first spacers extend for an entire length of the second optical member.

4. The laminated type optical member according to claim 2, wherein the first spacers include linear unit spacers that extend along the axes, the linear unit spacers are arranged along the axes.

5. The laminated type optical member according to claim 1, wherein the first spacers include point unit spacers that are dots on a plane of the plate surface of the second optical member, the point unit spacers are linearly arranged along the axes.

6. The laminated type optical member according to claim 1, wherein
the second optical member includes a base having a sheet shape and a lens portion including the hemisphere lenses defined on a plate surface of the base on a first optical member side and arranged along a direction that crosses at least the axes, and
the first spacers are arranged at intervals in a direction that crosses the axes, each of the intervals is larger than an interval of the hemisphere lenses in the direction that crosses the axes.

7. The laminated type optical member according to claim 6, wherein the first spacers are arranged such that a plurality of the hemisphere lenses are sandwiched between first spacers adjacent to each other in the direction that crosses the axes.

8. The laminated type optical member according to claim 1, wherein the first spacers are made of a same material as that of at least a portion of the second optical member on a first optical member side.

9. The laminated type optical member according to claim 8, wherein
the second optical member includes a base having a sheet shape and a lens portion defined on a plate surface of the base on the first optical member side, and
the first spacers are made of a same material as that of the lens portion.

10. The laminated type optical member according to claim 8, wherein the first spacers and the at least a portion of the second optical member on the first optical member side are made of an ultraviolet curable resin material.

11. The laminated type optical member according to claim 1 further comprising:
a third optical member disposed on an opposite side from a second optical member side relative to the first optical member or an opposite side from a first optical member side relative to the second optical member with a second gap between the first optical member and the third optical member to overlap the first optical member or between the second optical member and the third optical member to overlap the second optical member; and
a second spacer provided between the first optical member and the third optical member or the second optical member and the third optical member to maintain the second gap to define a second air layer, the second spacer being defined in a linear shape along a plate surface of the first optical member or the third optical member and being oriented such that an axis of the second spacer is tilted at an angle equal to or greater than 3° relative to the arrangement direction of the pixels and relative to the axes of the first spacers.

12. A lighting device comprising:
the laminated type optical member according to claim 1; and
a light source configured to apply light to the laminated type optical member.

13. A display device comprising:
the lighting device according to claim 12; and
a display panel comprising the pixels configured to display an image using light from the lighting device.

14. The display device according to claim 13, wherein the display panel is configured as the first optical member.

15. A television device comprising the display device according to claim 13.

\* \* \* \* \*